US011617056B2

(12) United States Patent
Strand et al.

(10) Patent No.: US 11,617,056 B2
(45) Date of Patent: *Mar. 28, 2023

(54) CONTEXT SENSITIVE PRESENTATION OF CONTENT

(71) Applicant: Snap Inc., Santa Monica, CA (US)

(72) Inventors: William Alexander Strand, Sammamish, WA (US); Travis M. Grigsby, Seattle, WA (US); Benjamin Ralph Hollis, Seattle, WA (US); Bobby Lo, San Francisco, CA (US); Christie Marie Heikkinen, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 166 days.

This patent is subject to a terminal disclaimer.

(21) Appl. No.: 17/301,700

(22) Filed: Apr. 12, 2021

(65) Prior Publication Data

US 2021/0235225 A1 Jul. 29, 2021

Related U.S. Application Data

(63) Continuation of application No. 16/653,604, filed on Oct. 15, 2019, now Pat. No. 11,006,242, which is a (Continued)

(51) Int. Cl.
*H04W 4/024* (2018.01)
*G06Q 10/02* (2012.01)
(Continued)

(52) U.S. Cl.
CPC ............ *H04W 4/024* (2018.02); *G06F 16/29* (2019.01); *G06F 16/313* (2019.01); *G06Q 10/02* (2013.01); *G06Q 50/01* (2013.01); *H04W 4/027* (2013.01)

(58) Field of Classification Search
CPC ..... H04W 4/024; H04W 4/029; H04W 4/021; H04W 4/08; H04W 4/02; H04W 64/00;
(Continued)

(56) References Cited

U.S. PATENT DOCUMENTS 666,223 A 1/1901 Shedlock
4,360,875 A 11/1982 Behnke
(Continued)

FOREIGN PATENT DOCUMENTS

CA 2887596 A1 7/2015
EP 2051480 A1 4/2009
(Continued)

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — Nimesh Patel
(74) *Attorney, Agent, or Firm* — Schwegman Lundberg & Woessner, P.A.

(57) ABSTRACT

Disclosed are systems, methods, and computer-readable storage media for displaying widgets. In some aspects, criteria for ranking widgets may be dynamically evaluated based on conditions associated with each widget. In some aspects, the conditions may consider a time or location of an event a social network user is scheduled to attend, and a relation to that time and location to a current time and/or current user location. Evaluation of the conditions may contribute to the determination of weights for each of the respective widgets, with the ranking based on the weights. Widgets with the highest rank may be invoked, and selectively displayed on an electronic display. Multiple possible parameter values for the displayed widgets may also be
(Continued)

dynamically ranked and selected values applied when invoking the widget.

18 Claims, 20 Drawing Sheets

Related U.S. Application Data continuation of application No. 16/140,719, filed on Sep. 25, 2018, now Pat. No. 10,499,191.

(60) Provisional application No. 62/569,987, filed on Oct. 9, 2017.

(51) Int. Cl.
*H04W 4/02* (2018.01)
*G06Q 50/00* (2012.01)
*G06F 16/29* (2019.01)
*G06F 16/31* (2019.01)

(58) Field of Classification Search
CPC . H04W 76/27; H04W 28/0268; H04W 72/10; H04W 84/042; H04W 28/08; H04W 40/005; H04W 72/1242; H04W 88/02; H04W 28/0236; H04W 28/0284; H04W 28/0289; H04W 36/32; H04W 48/04; H04W 64/003; H04W 4/22; H04W 88/06; H04W 48/02; H04W 48/06; H04W 48/08; H04W 48/12; H04W 28/10; H04W 36/22; H04W 4/00; H04W 4/027; H04W 60/04; H04W 64/006; H04W 72/0486; H04W 76/007; H04W 40/20; H04W 48/10; H04W 4/023; H04W 52/0216; H04W 72/0493; H04W 72/06; H04W 72/1252; H04W 8/18; H04W 4/80; H04W 12/06; H04W 36/0033; H04W 12/08; H04W 12/12; H04W 4/04; H04W 4/21; H04W 84/12; H04W 4/12; H04W 4/025; H04W 4/60; H04W 52/0251; H04W 68/00; G01S 19/19; G01S 19/50; G01S 5/0027; G01S 5/017; G01S 19/393; G01C 21/20; H04L 43/16; H04L 43/0876; H04L 43/0882; H04L 65/1016; H04L 47/20; H04L 47/805; H04L 12/1407; H04L 67/12; H04L 67/2847; H04L 63/0853; H04L 2012/2849; H04L 63/0861; H04L 67/04; H04L 43/08; H04L 12/2854; H04L 51/02; H04L 51/046; H04L 63/105; H04L 63/12; Y02D 70/1242; Y02D 70/1262; Y02D 70/142; Y02D 70/144; Y02D 70/146; Y02D 70/164; Y02D 70/1224; Y02D 70/1226; Y02D 70/1264; Y02D 70/168; Y02D 70/23; Y02D 70/24; Y02D 70/26; Y02D 70/00; Y02D 70/166; H04M 1/72577; H04M 1/67; H04M 1/72563; H04M 1/72569; H04M 1/72572; H04M 2242/04; H04M 2242/30; H04M 2250/02; H04M 1/6075; H04M 2250/74; H04M 1/7253; H04M 1/72552; H04M 2250/14; H04M 1/271; H04M 1/6066; H04M 1/66; H04M 1/72533; H04M 1/7258; H04M 11/007; H04M 2201/40; H04M 2250/12; H04M 2250/52; H04M 3/533; H04M 1/72522; H04M 1/0266; H04M 2250/10; H04M 1/6505; H04M 19/04; H04M 2250/60; H04M 1/64; H04M 3/42; H04Q 2213/13098; H04Q 2213/13164; H04Q 3/0091; B60W 2050/146; B60W 2250/308; B60W 2720/10; B60W 2750/308; B60W 30/146; B60W 30/16

See application file for complete search history.

(56) References Cited

U.S. PATENT DOCUMENTS

| | | |
|---|---|---|
| 4,581,634 A | 4/1986 | Wiliams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,340 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |

(56) References Cited

U.S. PATENT DOCUMENTS

| | | |
|---|---|---|
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,469,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,499,191 B1 | 12/2019 | Strand et al. |
| 11,006,242 B1* | 5/2021 | Strand .................. G06Q 50/01 |
| 2001/0037174 A1 | 11/2001 | Dickerson |
| 2002/0047868 A1 | 4/2002 | Miyazawa |
| 2002/0067308 A1 | 6/2002 | Robertson |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |

(56) References Cited

U.S. PATENT DOCUMENTS

| | | |
|---|---|---|
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Wilis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Ceiestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0046298 A1 | 2/2008 | Ben-yehuda et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0165032 A1 | 7/2008 | Lee et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipaikatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0248996 A1 | 10/2009 | Mandyam et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0037157 A1 | 2/2010 | Chang et al. |
| 2010/0062794 A1 | 3/2010 | Han et al. |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert et al. |
| 2010/0153144 A1 | 6/2010 | Miller et al. |
| 2010/0159944 A1 | 6/2010 | Pascal et al. |
| 2010/0161392 A1 | 6/2010 | Ashby et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |

(56) References Cited

U.S. PATENT DOCUMENTS

| | | |
|---|---|---|
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0001651 A1 | 1/2012 | Lalancette et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0041675 A1 | 2/2012 | Juliver et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer et al. |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |

(56) References Cited

U.S. PATENT DOCUMENTS

| | | |
|---|---|---|
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel et al. |
| 2014/0143143 A1 | 5/2014 | Fasoli et al. |
| 2014/0149519 A1 | 5/2014 | Redfern et al. |
| 2014/0155102 A1 | 6/2014 | Cooper |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith et al. |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0320195 A1 | 11/2016 | Liu et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0265040 A1 | 9/2017 | Friedlander et al. |
| 2017/0287006 A1 | 10/2017 | Azmoodeh et al. |
| 2018/0218470 A1 | 8/2018 | Belwafa et al. |
| 2019/0019329 A1 | 1/2019 | Eyler et al. |
| 2019/0043365 A1 | 2/2019 | Mcdavitt-van Fleet |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 16/140,719, 312 Amendment filed Oct. 15, 2019".

"U.S. Appl. No. 16/140,719, Non Final Office Action dated Apr. 17, 2019", 44 pgs.

"U.S. Appl. No. 16/140,719, Notice of Allowance dated Jul. 17, 2019", 7 pgs.

"U.S. Appl. No. 16/140,719, PTO Response to Rule 312 Communication dated Nov. 4, 2019", 2 pgs.

"U.S. Appl. No. 16/140,719, Response filed Jun. 27, 2019 to Non-Final Office Action dated Apr. 17, 2019", 11 pgs.

"U.S. Appl. No. 16/653,604, Corrected Notice of Allowability dated Jan. 29, 2021", 2 pgs.

"U.S. Appl. No. 16/653,604, Notice of Allowance dated Jan. 11, 2021".

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the internet: <URL: https://web.archive.org/web/20160711202454/http://www.blastradius.com/work/cup-magic>, (2016), 7 pgs.

"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.

(56) References Cited

OTHER PUBLICATIONS youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobil Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

\* cited by examiner

CONTEXT SENSITIVE PRESENTATION OF CONTENT

CROSS-REFERENCE TO RELATED APPLICATIONS

This application is a continuation of and claims priority to U.S. patent application Ser. No. 16/653,604, filed on Oct. 15, 2019, which is a continuation and claims priority to U.S. patent application Ser. No. 16/140,719, filed on Sep. 25, 2018, which claims priority to U.S. Provisional Application Ser. No. 62/569,987, filed on Oct. 9, 2017. The disclosure of the prior applications are considered part of this application, and are hereby incorporated by reference in their entireties.

TECHNICAL FIELD

The present disclosure generally relates to the technical field of social networking. In particular the disclosed methods, systems, and devices relate to identifying applications or widgets most relevant to a social network user.

BACKGROUND

Social networking is becoming essential to many as a form of communication. As social networking is adapted by a larger and larger portion of the world's population, the number of operations that can be accomplished via a social network application are also expanding. While this large number of social networking operations provides increasing value to social networking users, as the number of operations becomes larger, it also becomes harder for a user to identify those operations most relevant to them. Therefore, improved methods for identifying social network operations relevant to a user are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 7 shows a user interface 700 after a selection of a parameter.

DETAILED DESCRIPTION

Figure 1:
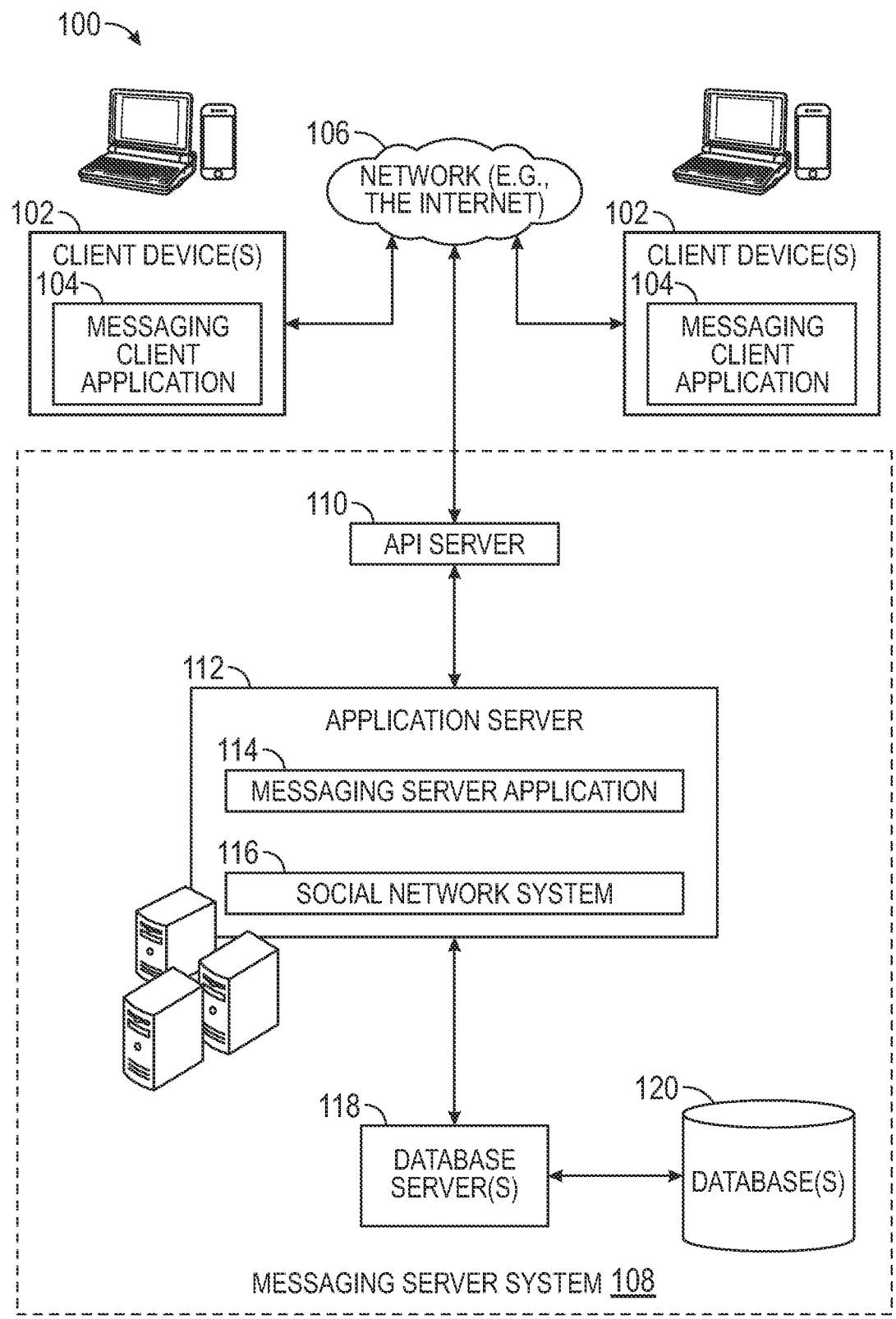
FIG. 1 is an exemplary block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The disclosed methods, devices, and systems provide improved techniques for selecting content for display on a mobile device. In some aspects, applications or widgets may be dynamically selected for display on a mobile device of a social network user based on individual weights assigned to each application or widget. The weights may be based on conditions present at the time the display is to be presented. In some aspects, the weights consider temporal elements. For example, if a social network user is scheduled to attend an event within a finite time period, application or widgets that assist the user in traveling to the event may be more relevant to the user than they might be when the user was at home with no plans to attend an event.

Applications as discussed herein may include an individual threaded environment that includes its own stack and local variables. A widget may refer to a visual indicator that has an action associated with it. Selecting the widget may perform the associated action. For example, some widgets may be associated with a particular URL, such that selection of the widget opens a browser application at the particular URL. Other widgets may be associated with secondary search actions. Some widgets may be associated with one or more other widgets, such that selecting these widgets displays the one or more other widgets. Some widgets may be associated with an application, such that selecting these widgets executes or invokes the associated application.

Some widgets may be associated with an action that unlocks content within an application, such as a social network application. Some widgets may be associated with a null action, such that selecting the widget performs no action.

In some aspects, locality of the user may be relevant to the types of applications or widgets displayed. For example, if the user is physically present at an event venue, venue oriented applications or widgets, such as food service or concession service applications or widgets may be more relevant than they would be if the user was not physically located at the venue. In some aspects, proximity to social network friends, or clustering of social network friends may be relevant to the types of widgets displayed, or parameters for those applications or widgets. For example, if a number of a social network user's friends are clustered at a particular location, a ride sharing applications or widget that takes the user to the location may be more relevant than the location would be if the cluster of friends were not present at that location.

In some aspects, signals from the user may be used to infer interest and or intent of the user, and thus shape applications or widgets displayed to that user. As one example, if a user expands details available for a ride sharing application or widget, this may be a signal that the user is interested in ride sharing. In response, additional ride sharing applications or widgets may be presented to the user. As another example, if the user is currently at a velocity that indicates they are a passenger in a vehicle, this may be used as a signal that the user is not interested in walking directions. Thus, the disclosed methods, systems, and devices utilize available information to derive an intent of the user and present applications or widgets most applicable to the user's intent. The derivation of their intent is provided via a dynamic prioritization system that weights the presentation of various applications or widgets based on a number of conditions that are continuously reevaluated. As some conditions become true while others change to false, the prioritization of the applications or widgets changes, and thus, which applications or widgets are displayed to the user is also dynamically updated.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Methods, devices, and systems disclosed herein may provide the social messaging system 100 with an ability to select applications or widgets to be invoked, and thus content for display on the user's display based on a context of the user to which the content is being displayed. The context may incorporate multiple characteristics of the user including the user's location, a location of one or more friends of the user, event locations the user is scheduled to attend, a current time of day, a current time relative to the start or end of an event, and many other considerations. Default parameters for these applications or widgets may also be dynamically selected.

In some aspects, a data driven weighting system is utilized to determine a ranking of applications or widgets for display. Parameter values for the displayed applications or widgets may also be determined based on the data driven weighting system.

Figure 2:
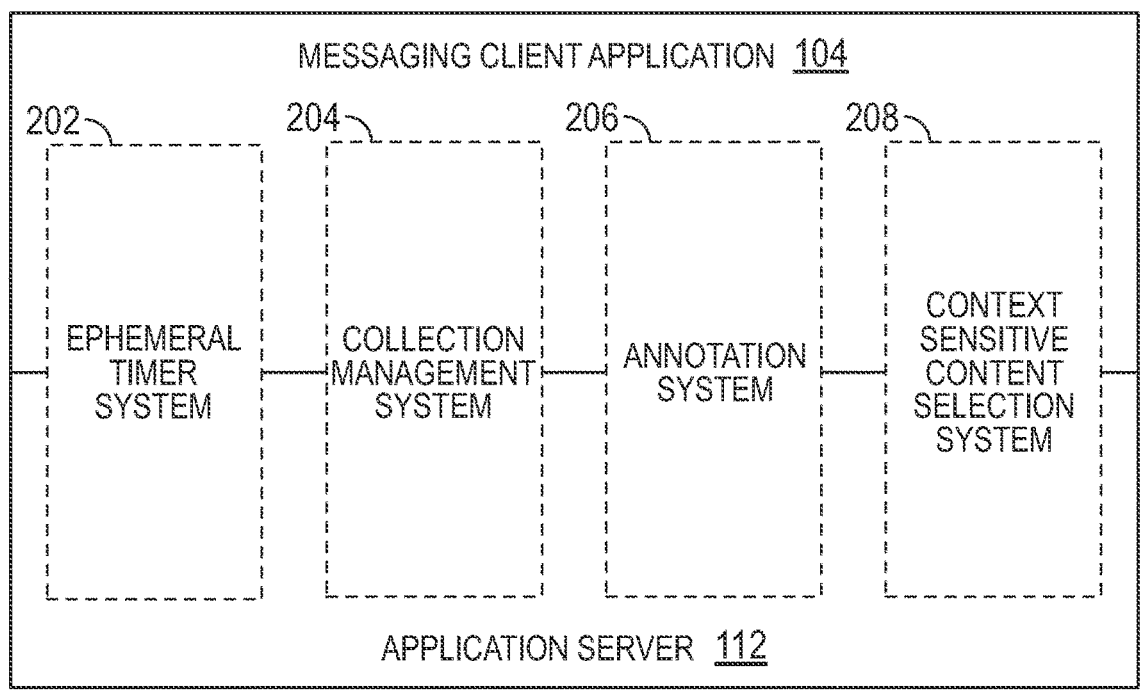
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a context sensitive content selection system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The context sensitive content selection system 208 provides for the selection of content for display based on multiple characteristics of the for which the content is being displayed. These characteristics include the user's location, a location of one or more of the user's friends, a time that the user may be scheduled to attend an event, a location of the event, a current time relative to the event time, and many other characteristics may be considered, and are discussed in more detail below.

Figure 3:
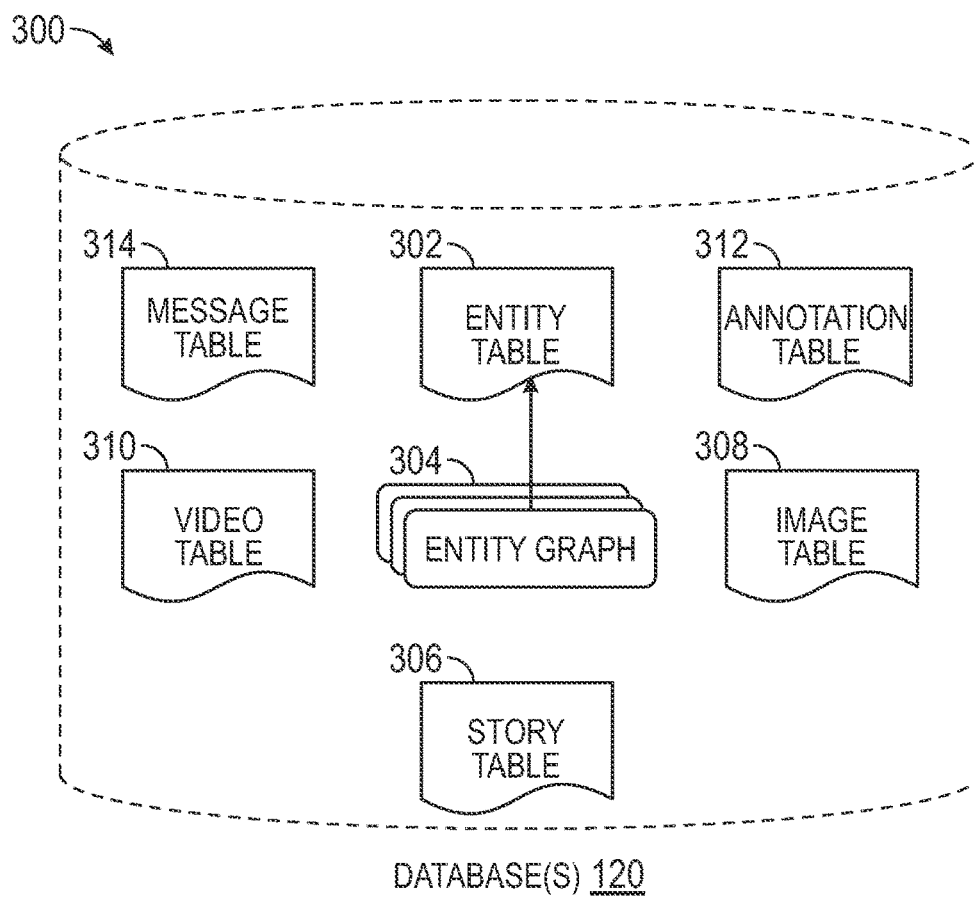
FIG. 3 is an exemplary data base schema utilized by the messaging system of FIG. 1.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 614. An entity table 602 stores entity data, including an entity graph 304. Entities for which records are maintained within the entity table 602 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
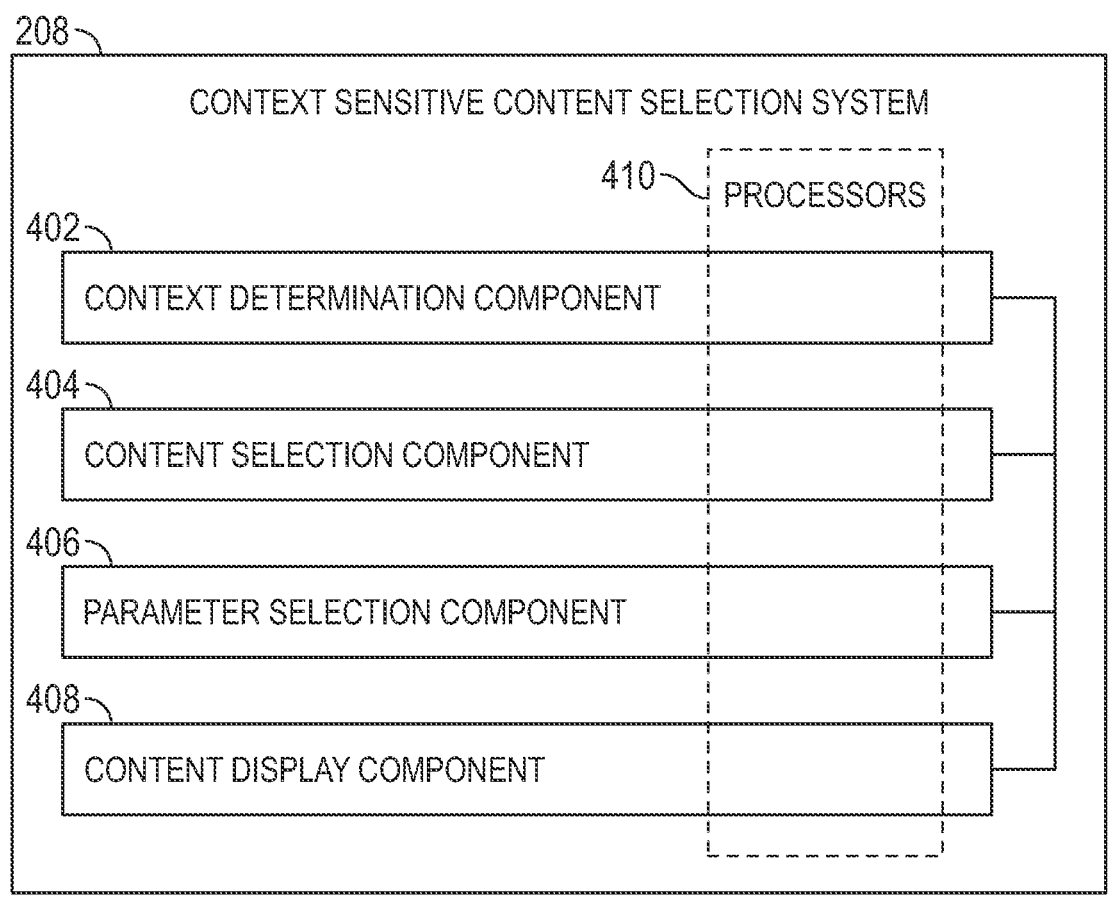
FIG. 4 is an exemplary block diagram illustrating functional components of a context sensitive content selection system that forms part of the messaging system, according to some example embodiments.

FIG. 4 is a block diagram illustrating functional components of the context sensitive content selection system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the context sensitive content selection system 208 to facilitate additional functionality that is not specifically described herein. As shown, the context sensitive content selection system 208 includes a context determination component 402, a content selection component 404, and a content display component 406.

The context determination component 402 may determine values for a variety of context parameters as discussed below. Context parameters may relate to one or more of a social network user and/or their current location, friends of the social network user and/or their current location, whether the current network user is scheduled to attend an event within a predetermined time period, and many other characteristics of the social network user within the social network environment. The context parameters may be referenced by conditions that are dynamically evaluated by the content selection component and/or parameter selection component 406 to develop a total weighting for applications or widgets and/or application or widget parameters.

The content selection component 404 may select applications or widgets for display. For example, as discussed below, the content selection component may implement a dynamic content selection system that reevaluates multiple conditions related to each potential application or widget for display to determine a ranking for the potential display of each application or widget. The content selection component 404 may then select one or more or widgets for display based on the dynamically computed weights or rankings. For example, depending on space available on a user interface for the display of dynamically selected applications or widgets, the content selection component may select the highest ranked application or widget first, the second highest ranked application or widget second for display, the third highest ranked application or widget third for display, etc, until enough applications or widgets have been selected to fill the available space on the user interface. One embodiment of the content selection component 404 is discussed below with respect to FIG. 9.

The parameter selection component 406 may determine parameters for the applications or widgets selected by the content selection component 404. For example, if a mapping application is selected by the content selection component, the parameter selection component 406 may determine a destination for the mapping application. In some aspects, the destination for the mapping application may be selected from multiple possible destination, each destination weighted based on the satisfaction (or lack thereof) of one or more dynamically evaluated conditions. One embodiment of the parameter selection component 406 is discussed below with respect to FIG. 10.

The content display component 408 may display content selected by the content selection component 404. The content display component 408 may also display the selected content with parameters selected by the parameter selection component 406. In some aspects, the content display component 408 may also receive input from the user interface indicating a selection of one of the displayed applications or widgets. In response to the selection, the content display component may invoke the selected application or execute an action associated with the widget with the parameters identified by the parameter selection component 406 and previously displayed by the content display component 408.

The above referenced functional components of the context sensitive content selection system 208 are configured to communicate with each other (e.g., via a bus, shared memory, a switch, or APIs). Collectively, these components facilitate selective presentation of content to users.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the context sensitive content selection system 208 may physically include an arrangement of one or more processors 410 (e.g., a subset of or among one or more processors of a machine) configured to perform the operations described herein for that component. As another example, any component of the content selection system may include software, hardware, or both, that configure an arrangement of the one or more processors 410 to perform the operations described herein for that component. Accordingly, different components of the context sensitive content selection system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components.

Figure 5:
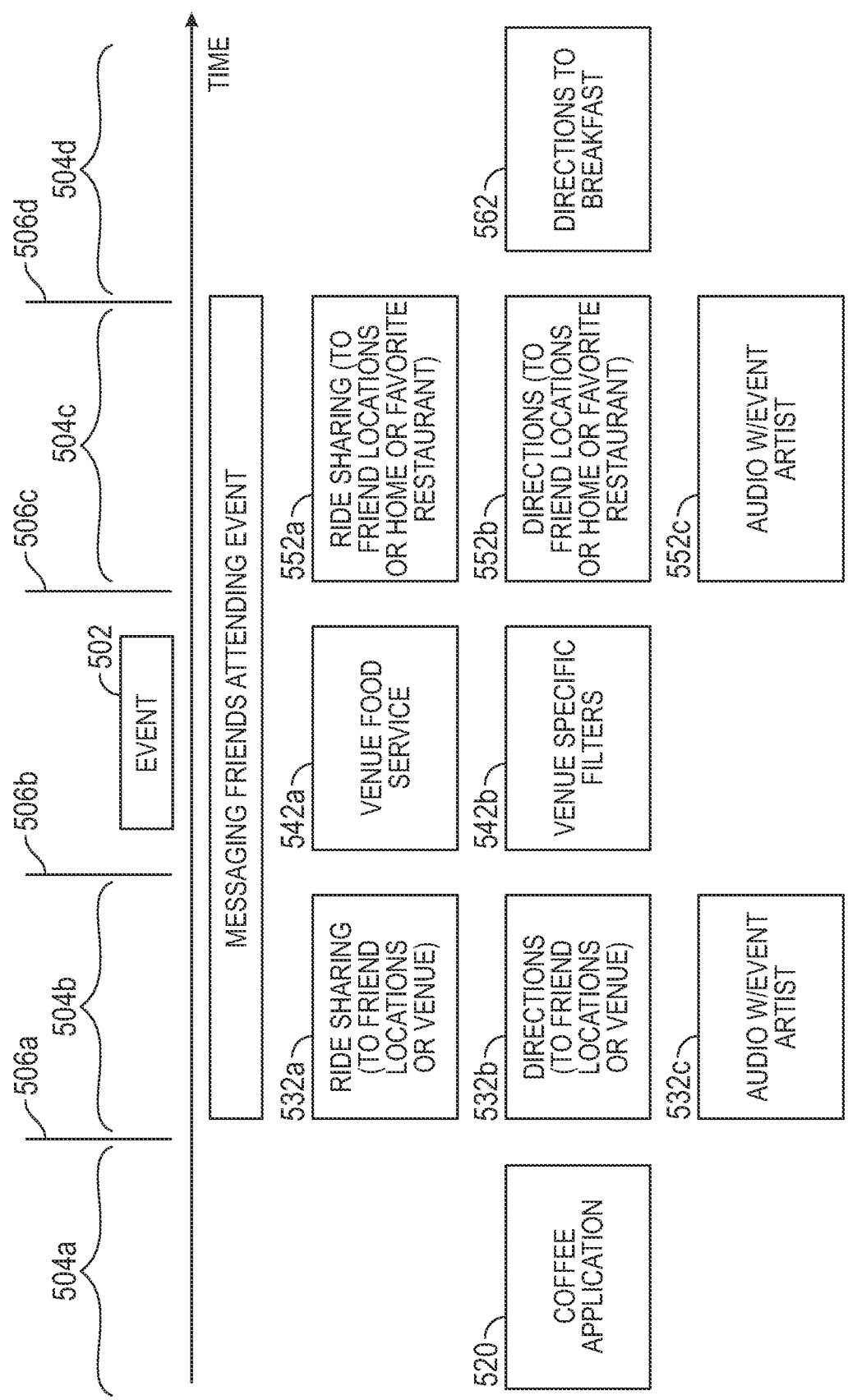
FIG. 5 shows widgets that may be presented on a user interface display of a user during certain time periods.

FIG. 5 shows a timeline including an event. The timeline includes the event 502, and also two periods of time before the event 504*a-b*. The timeline also includes two periods of time after the event 504*c-d*. The two periods of time before the event 504*a-b* may be separated by a threshold 506*a*. The event may begin at a second threshold time 506*b*. The event may end at a third threshold time 506*c*. The two periods of time after the event 504*c-d* may be separated by a fourth threshold time 506*d*.

FIG. 5 also shows applications or widgets that may be presented on a user interface display of a user during the time periods 504*a-d* and the event 502. For example, in the example of FIG. 5, when a current time is within the first time period 504*a*, a coffee application or widget 520 may be selected and presented for display. In some aspects, a current time may represent a time retrieved from an operating system time API within a previous 10, 9, 8, 7, 6, 5, 4, 3, 2, 1 seconds or less. During the second time period, which is closer to the event, applications or widgets 532, 534, and 536 may be selected and presented on the user interface display of the user. The applications or widgets 532*a-c* may be presented during the time period 504*b* based at least in part on the time period 504*b*, and the position of time period 504*b* on the timeline relative to a position of the event 502 on the timeline 500. For example, the time period 504*b* precedes the event 502 by less than the threshold time 506*a*.

The application or widget 532*a* may be a ride sharing application or widget. The destination for the ride sharing application or widget may be set, based on a current time being within the time period 504*b*, to be a location of one or more friends of the user or a location of a venue for the event 502. To set the destination for the ride sharing application or widget 532*a*, the disclosed methods, devices, or systems may pass the destination as a parameter to a ride sharing application or widget API.

The application or widget 532*b* is a directions application or widget. A default destination for the directions application or widget may be set, based on a current time being within the time period 504*b*. To set the destination for the directions application or widget 532*b*, the disclosed methods, devices, or systems may pass the destination as a parameter to a ride sharing application or widget API.

The application or widget 532*c* is shown as an audio application or widget. The audio application or widget may be presented with default audio for playback. The display of the audio application or widget in the user interface at the current time may be based on the current time being within the second time period 504*b*. The default audio for playback, in this case, music relating to music played at the event 502, may also be set based on the current time being within the time period 504*b*.

When the current time falls within a time period of the event 502, the applications or widgets 532*a-c* may be given a lower weight or priority for display. Applications or widgets 542*a-b* may be given a higher weight or priority for display when the current time moves from the time period 504*b* to the time period represented by the event 502. The higher weight may cause the applications or widgets 542*a-b* to be displayed instead of the lower weighted applications or widgets 532*a-c* during the time period of the event 502. Because the event time period 502 occurs during an event attended by the user, venue specific applications or widgets may be displayed. Thus, a display weight for the applications or widgets 542*a-b* may be based on the current time relative to a time of the event 502. The display weights for the applications or widgets 542*a-b* may also be based, in some aspects, on whether the user's location corresponds to a location of the event itself. For example, if the user has not yet reached the event location during at least a portion of the time period for the event 502, the weight of the venue related applications or widgets 542*a-b* may not be increased in some aspects.

When the current time moves from the event 502 to the time period 504*c* after the event (i.e. past the threshold 506*c*), display weights for the venue specific applications or widgets 542*a-b* may be decreased. Weights of other applications or widgets may be increased during the time period 504*c*, which is less than the predetermined threshold 506*d* after the end of the event 502. FIG. 5 illustrates three applications or widgets 552*a-c* that may have their weights increased upon the current time crossing the threshold 50*c* into the time period 504*c*.

Applications or widgets 552*a-b* are illustrated as a ride sharing application and directions application respectively. The default destination for the applications or widgets 552*a-b*, displayed during the time period 504*c*, may be selected based on the time period 504*c* being later than the event 502, but before the threshold time 506*d*. The destinations may be a home or a favorite restaurant for example. The destinations may also be based on the current time, regardless of its relation to the event 502 and time period 504*c*. For example, if the current time is within the time period 504*c*, but the current time is later than, for example, 4 AM, a restaurant may not be presented as a default location, while if the current time is earlier than a predetermined time, such as 4 AM, then the restaurant may be included as a default location.

Application or widget 552*c* is illustrated as an audio application or widget. A default audio file for playback may also be set based on the current time being within the time period 504*c*. For example, audio relating to an artist performing at the event 502 may be provided.

After the current time crosses the threshold 506*d* and enters the time period 504*d*, display weights for the applications or widgets 552*a-c* may be decreased. Display weights for other applications or widgets may increase when the current time crosses the threshold 506*d* and enters the time period 504*d*. For example, based on the current time being after the threshold 506*d*, applications or widgets directed to particular meal types may be displayed. For example, in some aspects, restaurants may be categorized based on a prime time of day for their patronage. This information may be accessed to determine types of restaurants to display in the user interface based on the time of day.

Figure 6:
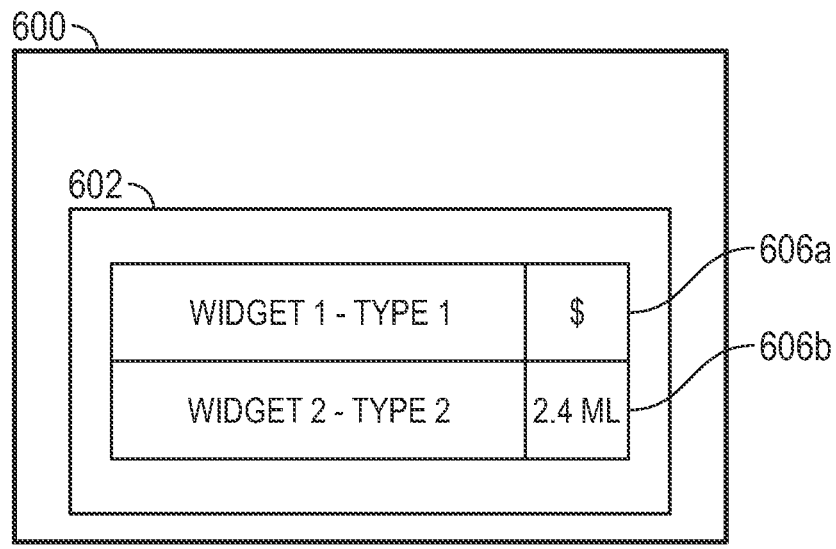
FIGS. 6-7 show exemplary prioritization of widgets for display on a user interface.
Figure 7:
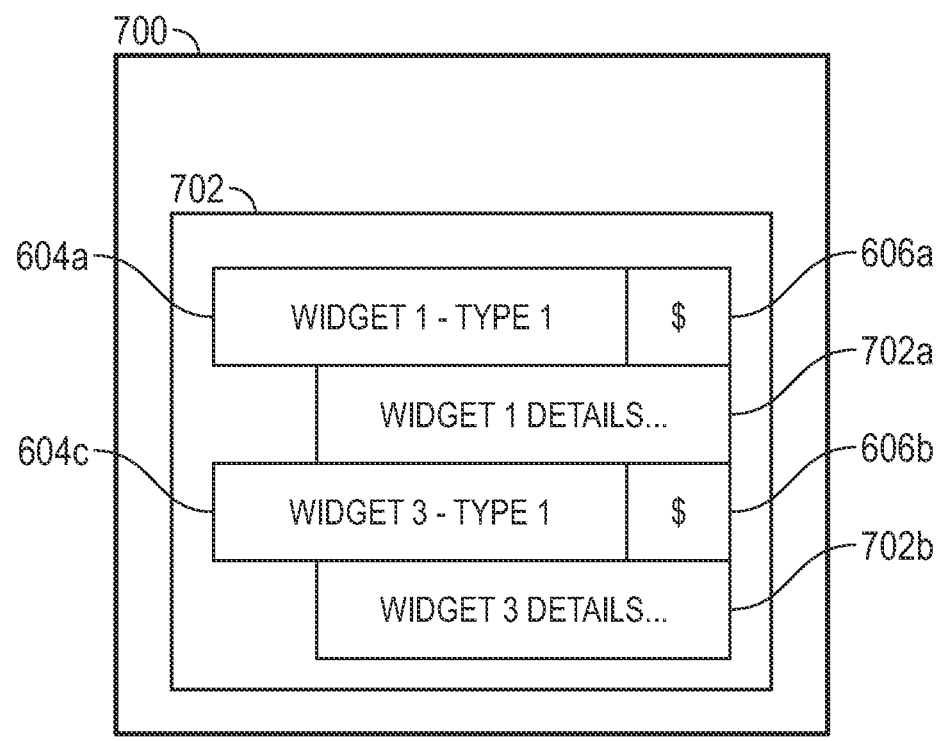

FIGS. 6-7 show exemplary prioritization of applications or widgets for display on a user interface. Whereas FIG. 5 demonstrated the use of a current time and a time relative to an event to prioritize the display of applications or widgets, FIGS. 6 and 7 prioritize applications or widgets based on signals received from the user interface itself. FIG. 6 shows a user interface 600 displaying two applications or widgets 604*a-b* within a display space 602. Each of the applications or widgets 604*a-b* includes a visible parameter 606*a-b* respectively.

FIG. 7 shows a user interface 700 after a selection of the parameter 606*a* of FIG. 6. As shown, some of the disclosed embodiments may utilize the selection of the parameter 606*a* as an indication to change display weights for one or more applications or widgets. For example, in response to selection of the parameter 606*a*, the user interface 700 now displays applications or widgets 602*a* and 602*c*. Application or widget 602*c* was not displayed in the interface 600 shown in FIG. 6. Whereas application or widget 602*b* was included in the interface 600, it is no longer displayed in the user interface 700.

The selection of the parameter 606*a* may also cause the user interface 700 to display details windows 702*a-b* for each of the applications or widgets 604*a* and 604*c* respectively. In order to provide display space for the applications or widgets 604*a* and 604*c*, and the details 702*a-b*, the display space 702 may be larger relative to display space 602 shown in FIG. 6.

Figure 8:
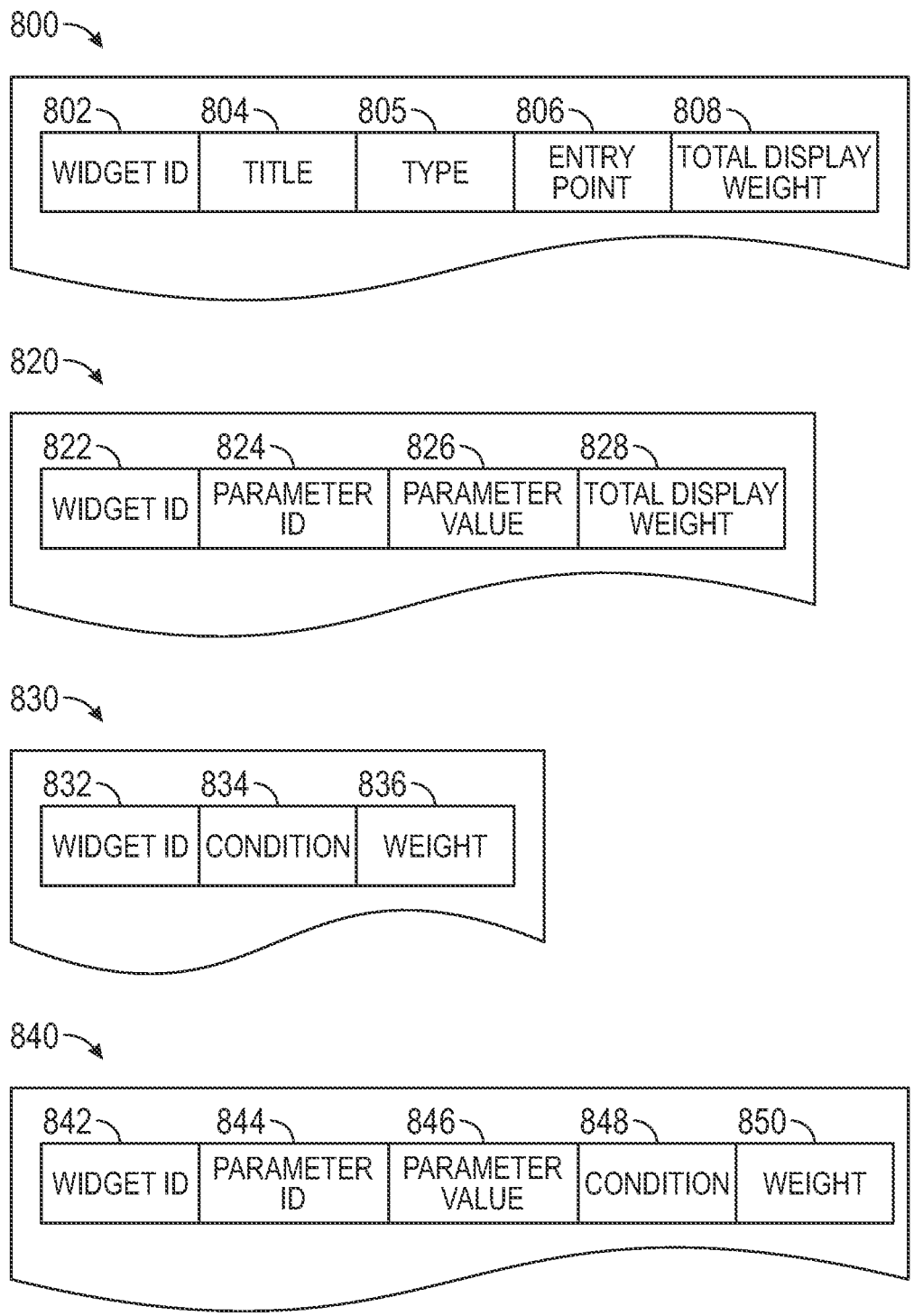
FIG. 8 shows exemplary databases that may be included in the database(s) 120.

FIG. 8 shows exemplary databases that may be included in the database(s) 120. FIG. 8 shows an exemplary application or widget relational database 802, exemplary parameter relational database 820, an exemplary application or widget condition relational database 830, an exemplary parameter condition relational database 840. The application or widget database 802 includes an application or widget identifier 802, an application or widget title 804, an application or widget type 805, an application or widget entry point 806, and a total display weight 808. The application or widget identifier 802 uniquely identifies an application or widget. The application or widget title 804 provides a title that may be displayed on a user interface when the application or widget is displayed. The application or widget type 805 functions to categorize applications or widgets identified in the application or widget database 800 into one of a plurality of categories or types. The type of the application or widget may be used, in some aspects, to rank the application or widget for display in some aspects. For example, based on input from the user, applications or widgets of a particular type may be ranked, based on their respective conditions, more highly than applications or widgets of other types in some aspects.

The entry point 806 provides an indication of how to run or select the application or widget, and the total display weight 808 indicates a weight value used in prioritizing the display of the application identified by the application identifier 802. For example, if the entry point is for an application it may indicate how to invoke the application. If the entry point is for a widget, the entry point field 806 may indicate an action associated with the widget. The calculation of the total display weight 808 is described below with respect to FIG. 9.

The application or widget parameter database 820 stores information relating to application parameters for the applications or widgets in the application database 800. The application parameter database 820 may be utilized to determine a default parameter value for the applications or widgets in the application database 800 if they are displayed.

The application or widget parameter database includes an application or widget identifier 822, which corresponds to the application identifier or widget 802 of the application or widget database 800, a parameter identifier 824, default parameter value 826, and a total display weight 828. The default parameter value 826 may represent a programmatic value or a constant value in various aspects. For example, in some aspects, the default parameter value may represent a constant value such as a home address of the user or a fixed text message string. Alternatively, the default parameter value may represent a value programmatically determined at the time the application or widget is displayed. For example, the default parameter value may represent a location of a friend of a user. Thus, in some aspects, the parameter value 826 may be represented by a programmatic function, which provides infinite possible programmatic determinations for default parameter values. In the event that the particular parameter value is selected for display, the programmatic function stored in the parameter value field 826 is invoked at display time, and the value of the parameter is determined and displayed. An exemplary determination of the total display weight 828 is discussed below with respect to FIG. 10.

The application or widget condition database 830 includes an application or widget identifier 832, which corresponds to the application or widget identifiers 822 and 802, a condition 834, and a weight 836. As described below, when a condition indicated by the condition column 834 evaluates, in some aspects, to a true value (i.e. non zero in some aspects), then the weight 836 is added to the corresponding total weight field 808 having an application or widget id 802 matching the application or widget id 832. An example condition in some aspects might be "($user.location=$home.location)." This condition may evaluate as true when the user is physically located, or their mobile device is physically located, at a home location). This condition might be utilized, in some aspects, to provide more weight to applications or widgets that are valuable to the user when they are at their home location. Another example condition in some aspects could be "$user.motion-context=WALKING"). This condition may evaluate as true if motion detection in a mobile device carried by the user detects that the user is currently walking. As a result, applications or widgets useful to pedestrians might receive a higher weight as a result of this condition in some aspects. While these example conditions are relatively simple, in some aspects, condition 834 may include programming logic. For example, in some aspects, condition 834 may include a Boolean function that includes any features available in typical run time programming languages, and returns either a true or false value. In some aspects, the condition 834 may include scripting or interpreted language source code.

The parameter condition database 840 includes an application or widget identifier 842, parameter identifier 844, parameter value 846, condition 848, and weight 850. Similar to the operation of the application or widget condition database, the weight 850 is added to the corresponding total weight column 828 for the parameter value 822, parameter 824, and parameter value 846 if the condition 848 for matching application or widget 842, parameter id 844 and parameter 846 evaluates to a true value. A condition 848 may be, in some aspects, a complex expression including programming logic. Similar to the condition 834, in some aspects condition 848 may be a Boolean function implemented in a run time programming language, such as a scripting or interpreted language source code. An example condition may be a Boolean function that determines how many of a user's friends are within a threshold distance of a location. If the number is above a threshold, the Boolean function may return true. Otherwise, it may return false. If the Boolean function returns true, the associated weight may elevate a weight of a location parameter equivalent to the location of the cluster of friends in some aspects.

Figure 9:
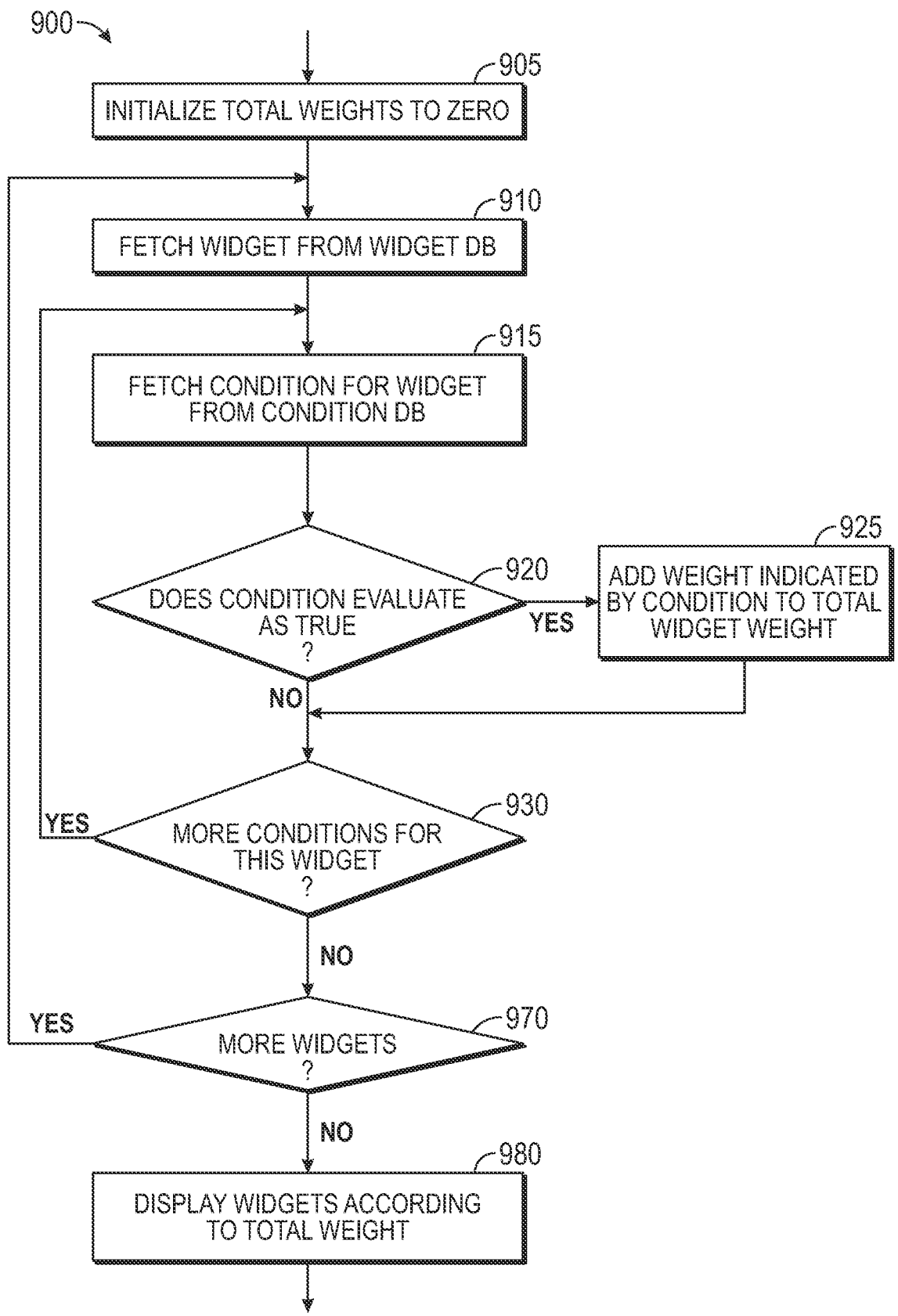
FIG. 9 is a flowchart for displaying a widget.

FIG. 9 is a flowchart for invoking an application or widget. Invocation of the application or widget may result in particular content being displayed on an electronic display of a mobile device in some aspects. In some aspects, one or more of the functions discussed below with respect to FIG. 9 may be performed by one or more hardware processors, such as the processor 410, discussed above with respect to FIG. 4. For example, in some aspects, instructions stored in an electronic memory (e.g. instructions 2204 and/or 2310 discussed below) may configure the one or more hardware processors (e.g. one or more processors 2304 and/or processing unit 2254, discussed below) to perform one or more of the functions discussed below with respect to FIG. 9.

In block 905, total weight values are initialized to zero. For example, the total weight values 808 may be initialized to zero in some aspects.

In block 910, an application or widget is identified from the database. For example, a unique row of the exemplary relational database 800 may be obtained.

In block 915, a condition for the application or widget is obtained. In some aspects, this may be obtained from the application or widget condition database 830. For example, a row of the application or widget condition database 830 having an application or widget id column 832 equivalent to the application or widget id column 802, which may have been identified in block 910, may be identified. The condition 834 for the application or widget 832 may be the condition identified or obtained in block 915.

In block 920, the condition is evaluated. If the condition evaluates to a true value (e.g. non-zero in some aspects), then process 900 moves from decision bock 920 to block 925, which adds the weight corresponding to the condition to a total application or widget weight. For example, block 925 may add the weight value 836 to the total weight value 808.

Block 930 determines if additional conditions are indicated for the application or widget identified in block 910. If so, processing returns to block 910 and another application or widget is obtained. Otherwise, process 900 moves to block 970, which determines if there are additional applications or widgets to process. If there are more applications or widgets, process 900 moves to block 905, where a new application is obtained. Otherwise, process 900 moves to block 980, which displays applications or widgets according to their total weights (e.g. 808). For example, in some aspects, a first predetermined number of applications or widgets having the highest weights may be displayed, while other applications or widgets may not be displayed.

Figure 10:
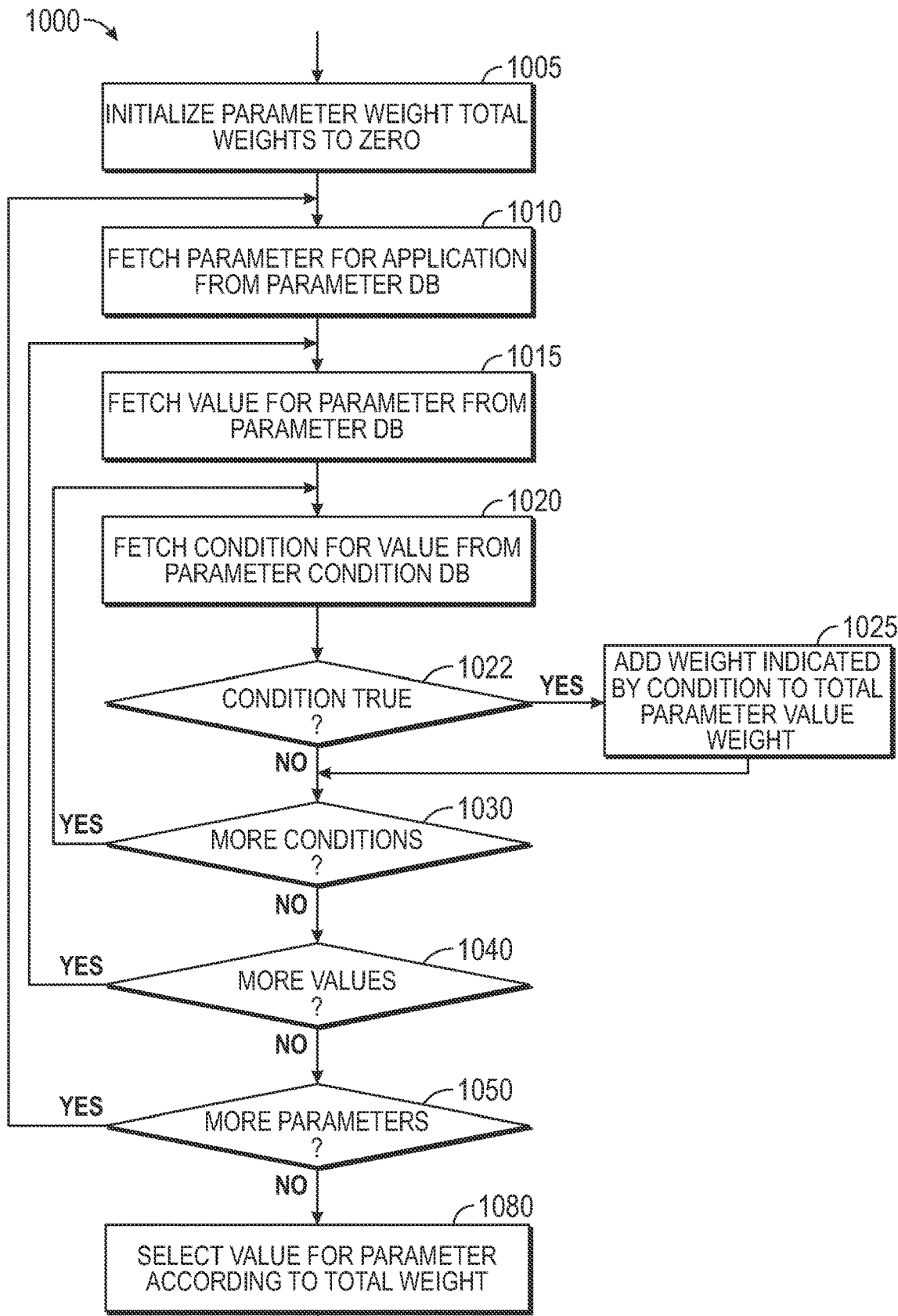
FIG. 10 is a flowchart of a method of determining a value for a parameter.

FIG. 10 is a flowchart of a method of determining a value for a parameter. The parameter may be passed to an application or widget when the application or widget is run/invoked or selected. In some aspects, invocation of the application or widget may result in particular content being displayed on an electronic display of a mobile device in some aspects. In some aspects, one or more of the functions discussed below with respect to FIG. 10 may be performed by one or more hardware processors, such as the processor 410, discussed above with respect to FIG. 4. For example, in some aspects, instructions stored in an electronic memory (e.g. instructions 2204 and/or 2310 discussed below) may configure the one or more hardware processors (e.g. one or more processors 2304 and/or processing unit 2254, discussed below) to perform one or more of the functions discussed below with respect to FIG. 10.

In block 1005, total parameter value weight values are initialized to zero. For example, the total parameter value weight values 828 may be initialized to zero in some aspects.

In block 1010, a parameter for a reference application or widget is identified from the parameter database. The reference application or widget may be an application or widget selected for display. For example, the reference application or widget may be selected for display by block 980 of FIG. 9. A row of the exemplary relational database 820 may be obtained having an application or widget id 822 corresponding to the reference application or widget.

In block 1015, a parameter value for the parameter of block 1010 is obtained. For example, in some aspects, a row in a database (e.g. 846) having a particular parameter value field (e.g. 826) may be obtained in block 1015.

In block 1020, a condition for the parameter value of block 1015 is obtained. In some aspects, this may be obtained from the parameter condition database 840. For example, a row of the parameter condition database 840 having an application or widget id column 842, parameter id column 844, and parameter value column 846 equivalent to the reference application or widget, parameter identified in block 810, and parameter value identified in block 815 respectively may be obtained. The condition (e.g. 848) for the application or widget 842, parameter id 844, and parameter value 846 may be the condition 848 identified or obtained in block 1020.

In block 1022, the condition is evaluated. If the condition evaluates to a true value (e.g. non-zero in some aspects), then process 1000 moves from decision bock 1022 to block 1025, which adds the weight corresponding to the condition to a total parameter value weight. For example, in some aspects, block 1025 may add the weight value 850 for the condition 848 to the total weight value 828.

Decision block 1030 determines if additional conditions are indicated for the parameter value identified in block 1015. If so, processing returns to block 1020 and another condition is obtained. Otherwise, process 1000 moves to block 1040, which determines if there are additional parameter values to process. If there are more parameter values, process 1000 moves to block 1015, where a new parameter value is obtained. Otherwise, process 1000 moves to decision block 1050, which determines if there are additional parameters to evaluate. If there are, process 1000 returns to block 1010, and an additional parameter is identified. For example, the parameter may be identified, in some aspects, from the database 820. Returning to the discussion of block 1050, if there are no additional parameters, process 1000 moves from 1050 to block 1080, which selects a parameter value for the parameter according to the total weight(s) (e.g. 828). For example, in some aspects, parameter values for a particular parameter may be ranked according to their total weights, and the parameter value with the highest weight may be selected for the parameter.

Figure 11:
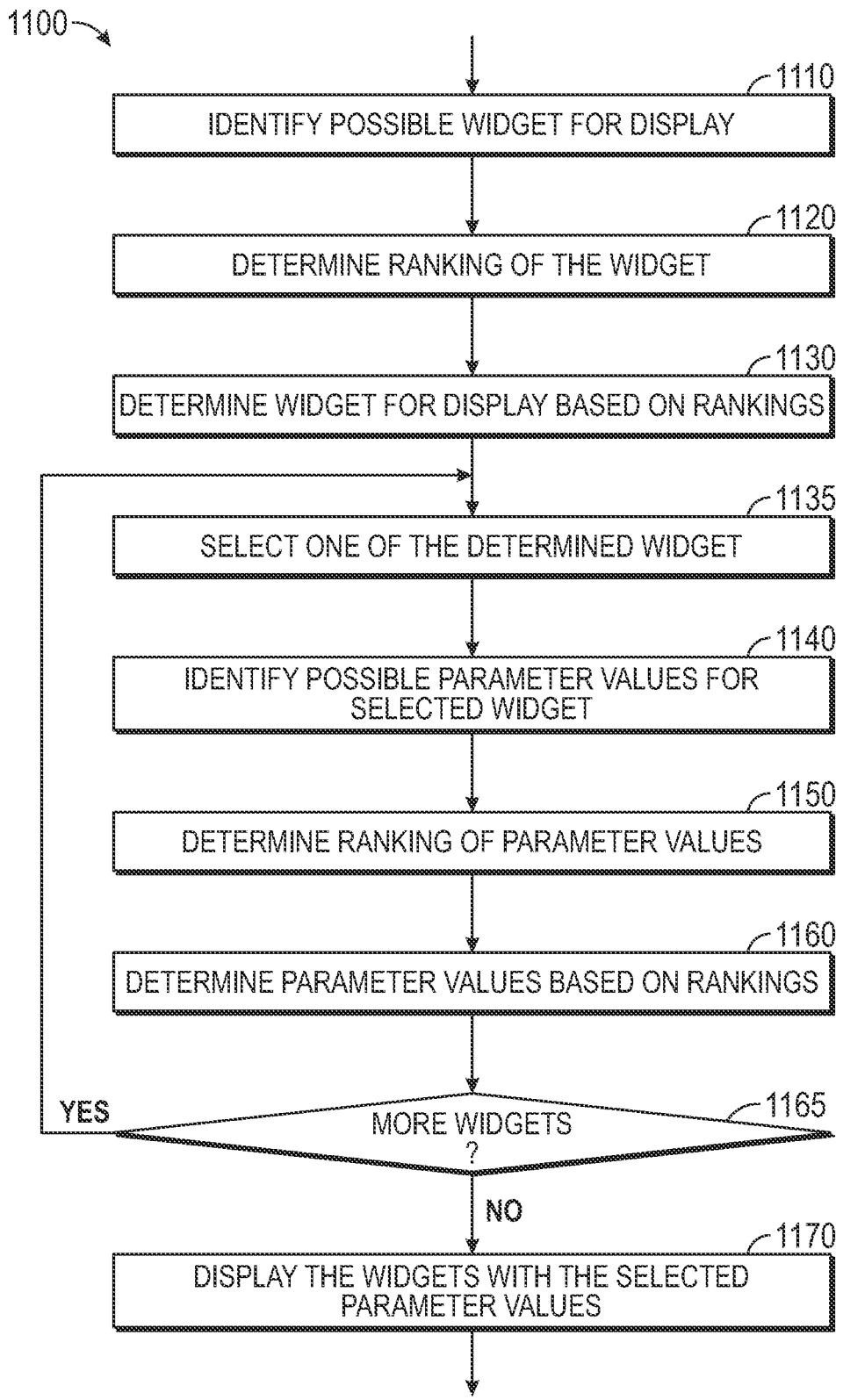
FIG. 11 is a flowchart of a method of displaying widgets in a user interface.

FIG. 11 is a flowchart of a method of displaying one or more applications or widgets. The displayed applications or widgets may display information, such as content, in a user interface. In some aspects, one or more of the functions discussed below with respect to FIG. 11 may be performed by one or more hardware processors, such as the processor 410, discussed above with respect to FIG. 4. For example, in some aspects, instructions stored in an electronic memory (e.g. instructions 2204 and/or 2310 discussed below) may configure the one or more hardware processors (e.g. one or more processors 2304 and/or processing unit 2254, discussed below) to perform one or more of the functions discussed below with respect to FIG. 11.

In block 1110, possible applications or widgets for display are identified. For example, in some aspects, block 1110 may identify a list of applications or widgets based on one or more criteria. In some aspects, block 1110 may consult a database of applications or widgets, for example, the database 800 in some aspects.

In block 1120, a ranking of the application is determined. In some aspects, the ranking may be determined based on process 900, discussed above. For example, in some aspects, applications or widgets with a highest total weight (e.g. 808) may be considered the highest ranked applications or widgets, or ranked "above" other applications or widgets having lower total weights (e.g. 808).

In block 1130, applications or widgets for display are determined based on the rankings. For example, in some aspects, block 1130 may include one or more of the functions discussed above with respect to block 980.

In block 1135, one of the applications or widgets determined in block 1130 is selected.

In block 1140, possible parameter values for the selected application or widget are identified. For example, in some aspects, block 1140 may search a parameter database, such as parameter database 820, for the application or widget selected in block 1135. For example, the selected application or widget may receive one, two, three, or any number of parameters in various embodiments. If the selected application or widget receives two parameters for example, block 1140 may identify possible values for each of the two parameters. The possible values may be identified from the parameter database 820 in some aspects.

Block 1150 determines ranking of the parameter values for each parameter. For example, in some aspects, block 1150 may be performed according to process 1000, discussed above.

In block 1160, parameter value for the selected application or widget are determined based on the rankings. For example, in some aspects, block 1160 may include one or more of the functions discussed above with respect to block 1080. In some aspects, parameter values with the highest ranking are selected for each parameter of the application or widget selected in block 1135. Decision block 1165 determines if parameters for additional applications or widgets, determined in block 1130, need to be identified. If so, process 1100 returns to block 1135, and a different application or widget of the applications or widgets determined in block 1130 is selected. Otherwise, process 1100 moves to block 1170, which displays the applications or widgets (determined in block 1130) with the parameter values (determined in block 1160).

Figure 12:
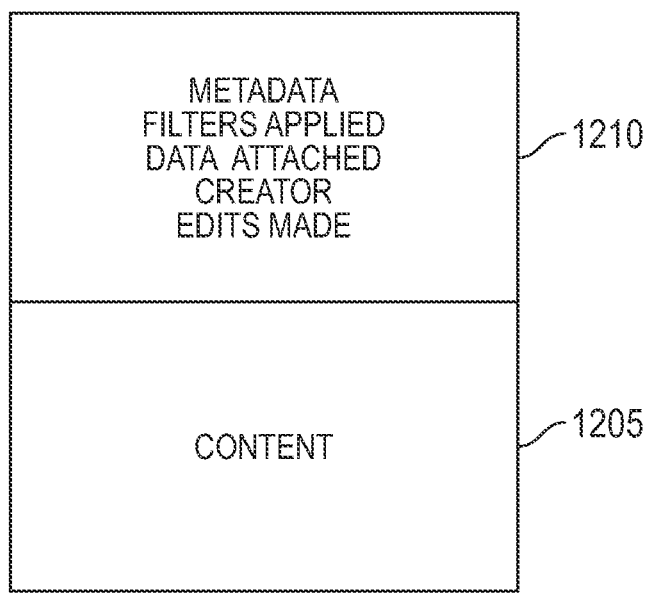
FIG. 12 is exemplary content for use in accordance with some embodiments described herein.

FIG. 12 is exemplary content. The content 1200 may include data 1205 that defines the content itself. For example, if the content is a video, the data 1205 may define the video frames and/or audio data of the video. If the content is a text message, the data 1205 may define the text of the message. The content 1200 may also include metadata 1210. The metadata may define additional characteristics of the content, such as filters that were previously applied to the content, a creator of the content (such as a user name or user identifier in a social network), previous edits made to the content, or other characteristics of the content 1200. Some of the disclosed methods, systems, and devices may alter processing of the content 1200 based on the metadata.

Figure 13:
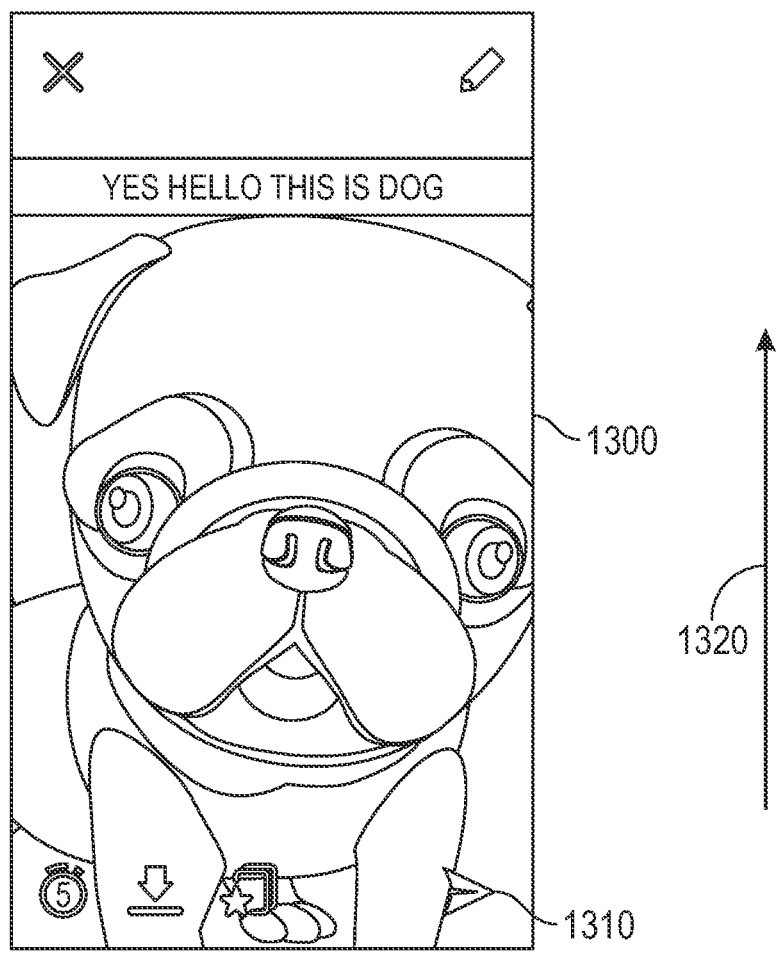
FIG. 13 shows an example user interface showing exemplary content.

FIG. 13 shows an example user interface showing exemplary content. In some aspects, the content 1300 shown in FIG. 12 may be equivalent to the content 1200 discussed above with respect to FIG. 12. In some aspects, if metadata (e.g. 1210) is attached to the content 1300, a carrot 1310 may be displayed, indicating more information is available. The more information may be available, in some aspects, if an event filter is applied to the content 1300, the content 1300 is included in a particular user's story, and the particular user is a friend of a user viewing the content 1300, or if there is an attachment to the content (e.g. metadata such as metadata 1210).

In some aspects, a first user may capture or otherwise create the content 1300. They may then send the content to a second user. Alternatively, the first user may include the content in their "story." The second user may then view the story, and as a result view the content 1300. The carrot 1310 may indicate to the second user that additional information is available. For example, in some aspects, the content may be created at a time or place of a particular event. The event may have certain characteristics associated with it. For example, the event may have one or more artists and a location. One or more of the artists may have additional upcoming events at particular locations. Thus, in some aspects, if the content 1300 relates to the event, at least a portion of this additional information may be accessible via the carrot 1310.

In some aspects, a swipe up gesture 1320 may display a context menu.

Figure 14:
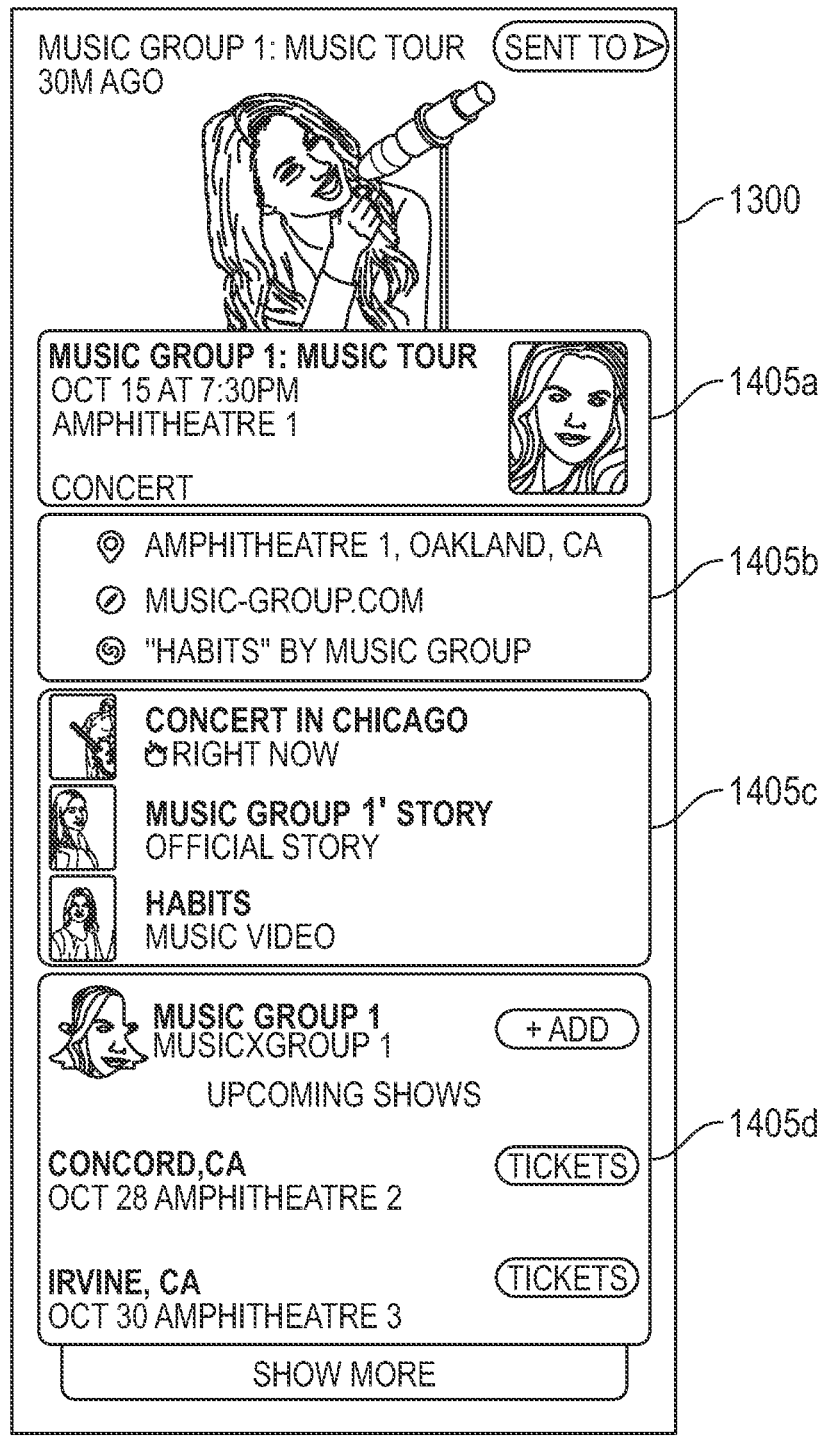
FIG. 14 shows one embodiment of a context menu.

An exemplary context menu is shown in FIG. 14. The context menu 1400 may be displayed "on top of" the content 1300, an embodiment of which is shown in FIG. 14. Context many 1400 may provide access to additional "cards" that display information relating to the content 1300. In some aspects, a card may be a user interface element showing users grouped information about a certain entity associated with content. For example, if an event filter is applied to the content 1300, event specific cards may be available that display information relating to the event. As shown in FIG. 14, event cards 1405a-d are shown.

Figure 15:
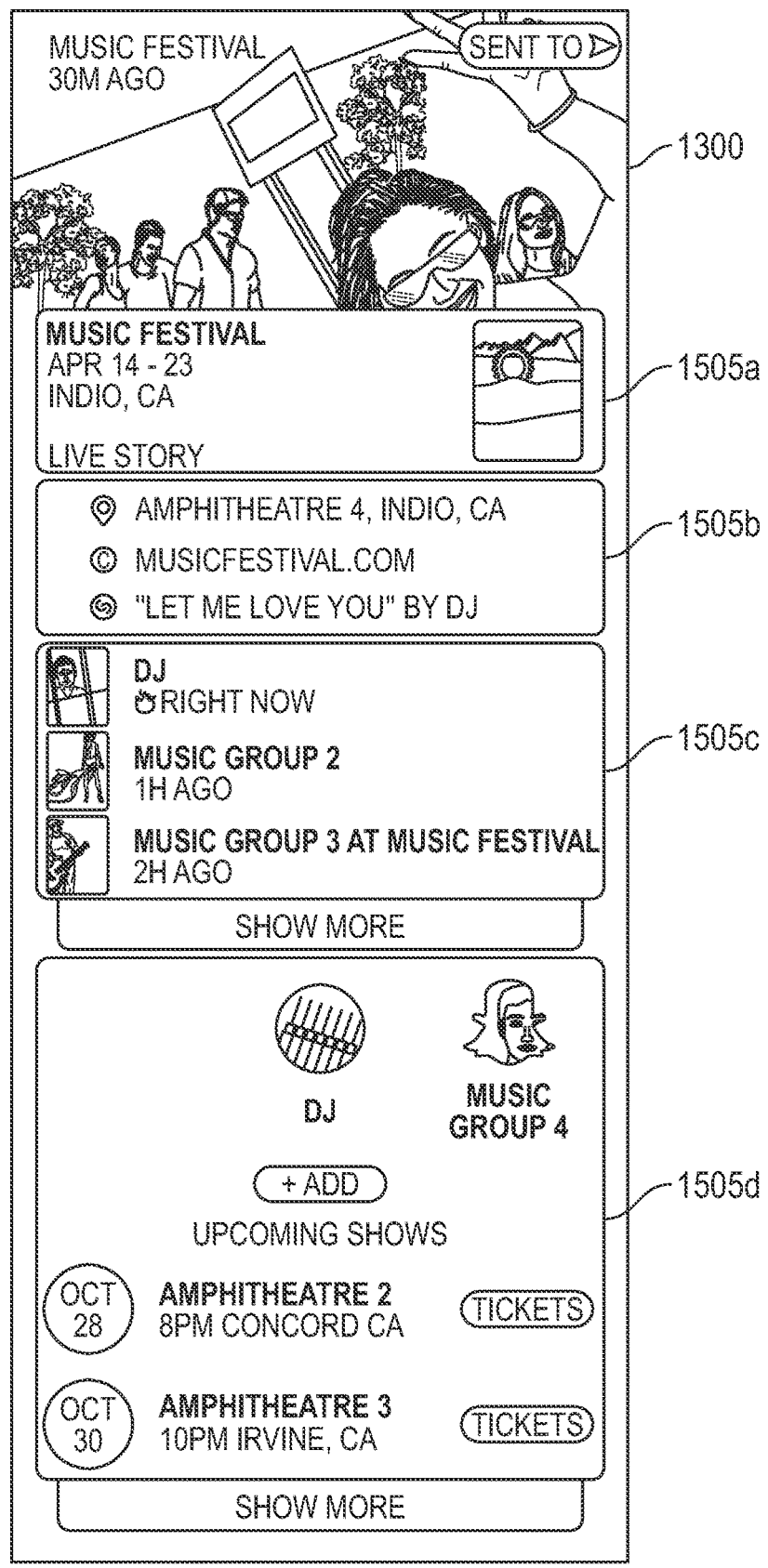
FIG. 15 shows one embodiment of a context menu.

FIG. 15 is an exemplary context menu. Context menu 1500 may be displayed "on top of" content 1300, an embodiment of which is shown in FIG. 13. Context menu 1500 includes event cards 1505a-d.

If some other aspects, if content menu 1300 is from a friend's story, a reply card may be presented in the context menu. In some aspects, if the reply card is the only item in the context menu, then the keyboard will be present with a text box in context to facilitate the reply.

In some aspects, if a sender of the content 1300 included an attachment with the content 1300, an attachments card may be present in the context menu. The attachment card may appear above any venue cards that may also be presented.

Figure 16:
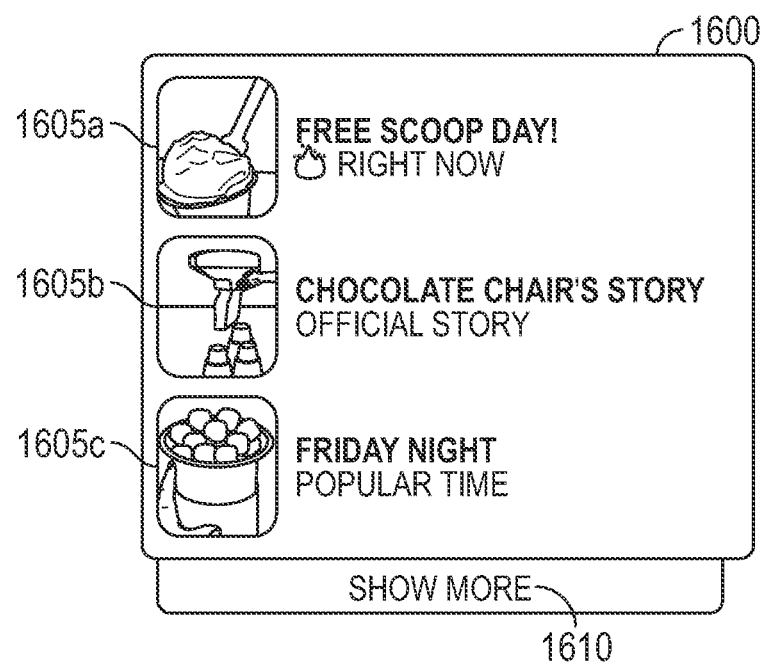
FIG. 16 shows one embodiment of a vibe card.

FIG. 16 is an exemplary vibe card. A vibe card may provide a mechanism for a user on a social network to better understand a "vibe" of a venue of an event they are attending. The vibe card may provide a series of different stories. As shown in FIG. 16, the vibe card 1600 includes shows three stories 1605a-c. While the exemplary vibe card 1600 of FIG. 16 shows three stories, any number of stories is contemplated. For example, one (1), two (2), four (4), or five (5) stories may be displayed in various aspects. In some aspects, a vibe card may include a "show more" control 1610, enabling the vibe card to show more stories than are currently displayed.

In some aspects, at least some of the stories displayed in the vibe card 1600 may include metadata. In some aspects, the metadata may include one or more of a story name, an image thumbnail, a story type. The story type may include one or more of right now, official story, popular time, or friend story. A right now story may include a series of content that has been captured within a predetermined period of time. The content may have been captured at the venue. Thus, in some aspects, a social network may receive a plurality of images received during a predetermined time period, and filter the content to that content captured within a predetermined radius of a geographic location corresponding to an event. This filtered content may be provided in the "right now" story. The predetermined time period may be a rolling time period, such that content remains in the predetermined time period until it reaches a particular "age," and is then removed from the "right now" story. An official story may be a story that relates to a business occurring at the event. A popular time story may be a story that is most popular within a predetermined time period. Most popular may be measured by a number of impressions or views across all social network users, or users physically located at the event or scheduled to attend the event. A friend story may include content captured by a friend of the viewing user. The friend story may include only content captured at the venue for the event in some aspects. In some aspects, the friend story may include only content tagged with a venue geofilter.

In some aspects, selecting one of the stories 1605a-c may display a detail page for the story. For example, in some aspects, selection of a story may display a first previously unseen content (for the selecting user) in the story. In some aspects, a swipe down gesture from within a story may return the swiping user to the vibe card.

Figure 17:
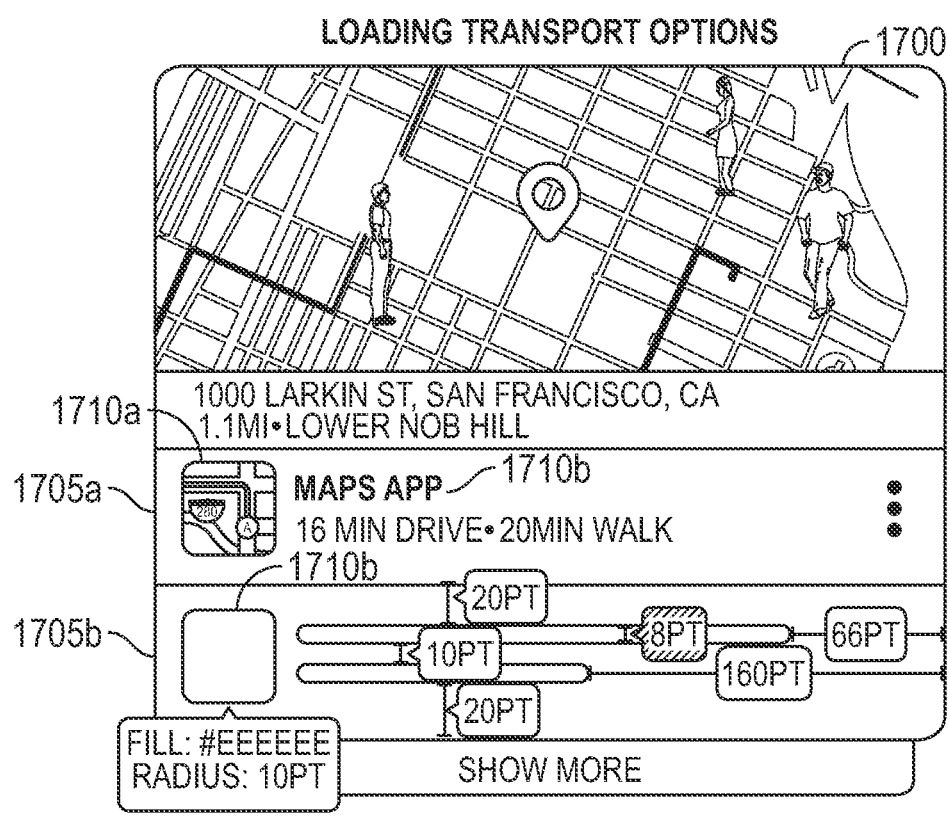
FIG. 17 shows one embodiment of a ride sharing user interface.

FIG. 17 is an exemplary ride sharing user interface. The exemplary user interface 1700 shows two rows 1705a-b for transportation options. The first row has completed a loading process, such that an icon 1710a and title 1715b are displayed. The second row 1705b has not completed the loading process yet, and thus displays a blank icon 1710b. In some aspects, each of the two rows 1705a-b may display applications or widgets that are selected for display according to process 900, discussed above with respect to FIG. 9.

Figure 18:
FIG. 18 shows one embodiment of a ride sharing user interface.

FIG. 18 is an exemplary ride sharing user interface. The exemplary user interface 1800 shows three rows 1810a-c of ride sharing applications or widgets 1812a-c. Each row 1810a-c also displays additional information 1815a-c relating to the three applications or widgets. Second additional information 1816b is also displayed for application or widget 1812b. In the exemplary user interface 1800, there is no corresponding second additional information for each of applications or widgets 1812a or 1812c. Each row 1810a-c also includes "more details" icons 1820a-c that, when selected, may display additional information relating to the application or widget displayed in the respective row 1805a-c. In some aspects, the applications or widgets 1812a-c may be selected for display in the user interfaced 1800 according to process 900, discussed above with respect to FIG. 9. In some aspects, the additional information 1815a-c, and/or the additional information 1816b may be selected for display according to process 1000, discussed above with respect to FIG. 10.

Figure 19:
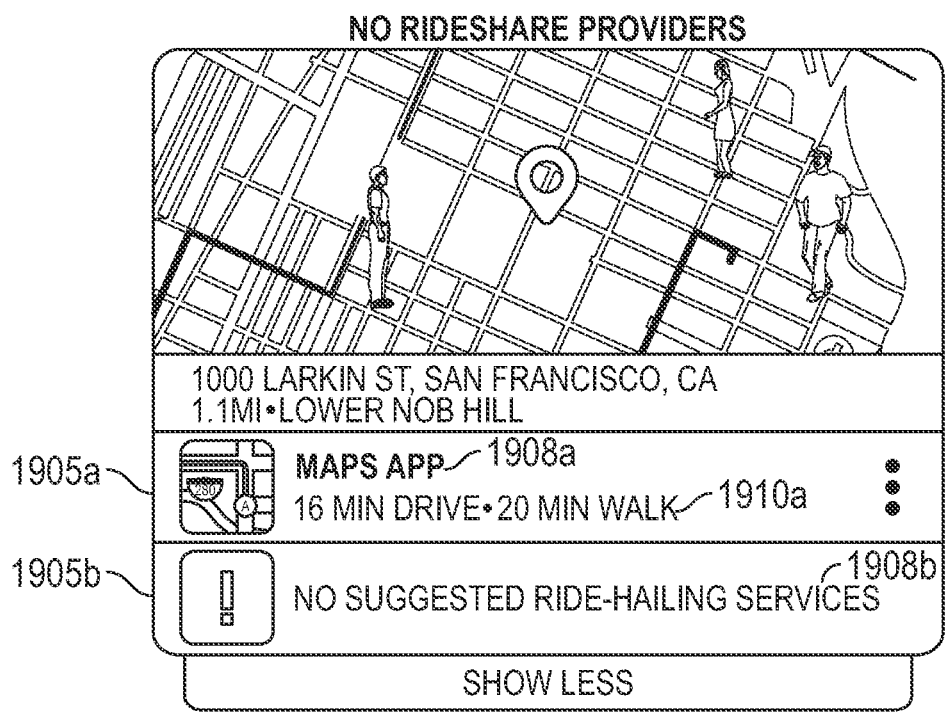
FIG. 19 shows an exemplary ride sharing user interface.

FIG. 19 shows an exemplary ride sharing user interface. The user interface 1900 shows two rows 1905a-b including a single application or widget 1908a. An error message 1908b is displayed, indicating no applications or widgets of a particular type are available for display in the second row 1905b. FIG. 19 also shows additional information 1910a relating to the application or widget 1908*a*. In some aspects, the application or widget displayed in row 1905*a* may be selected for display according to an embodiment of process 900, discussed above with respect to FIG. 9. In some aspects, the additional information 1910*a* may be selected for display according to process 1000 discussed above with respect to FIG. 10.

Figure 20:
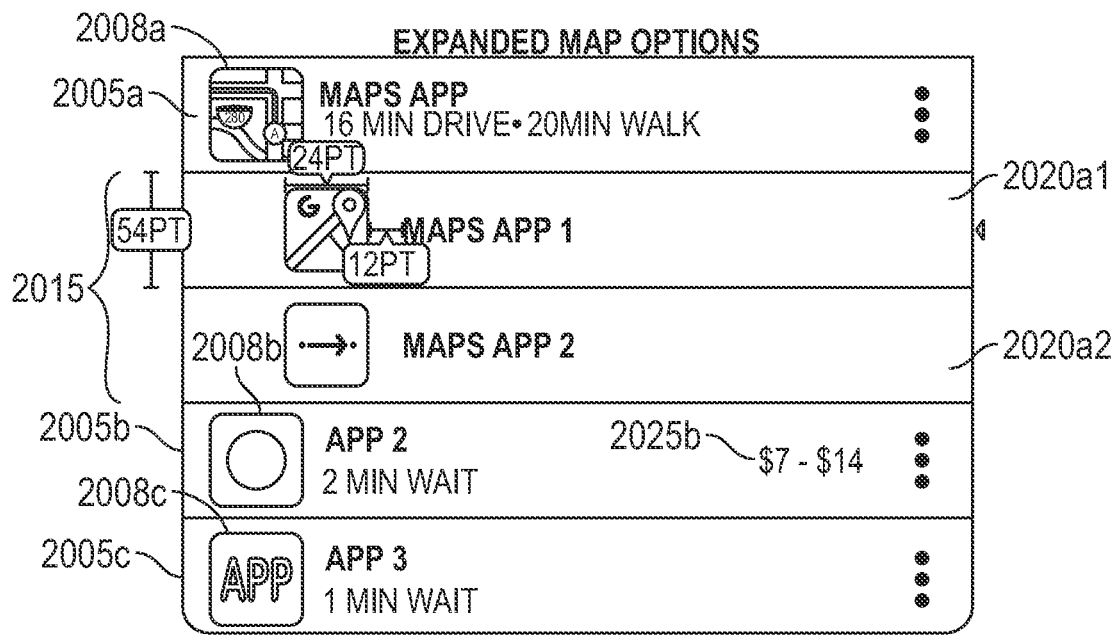
FIG. 20 shows an exemplary ride sharing user interface.

FIG. 20 shows an exemplary ride sharing user interface. The user interface 2000 shows three rows 2005*a-c* including three applications or widgets 2008*a-c* respectively. The first application, 2005*a*, shows an expanded detail section 2015, including two sub-applications or widgets 2020*a*1 and 2020*a*2. Each of the applications or widgets 2005*a-c* of FIG. 20 may be selected for display, in some aspects, according to process 900, discussed above with respect to FIG. 9. Additional detail shown with respect to any of the applications or widgets 2008*a-c*, such as additional details 2025*b* may be selected for display based, in some aspects, on process 1000, discussed above with respect to FIG. 10.

Figure 21:
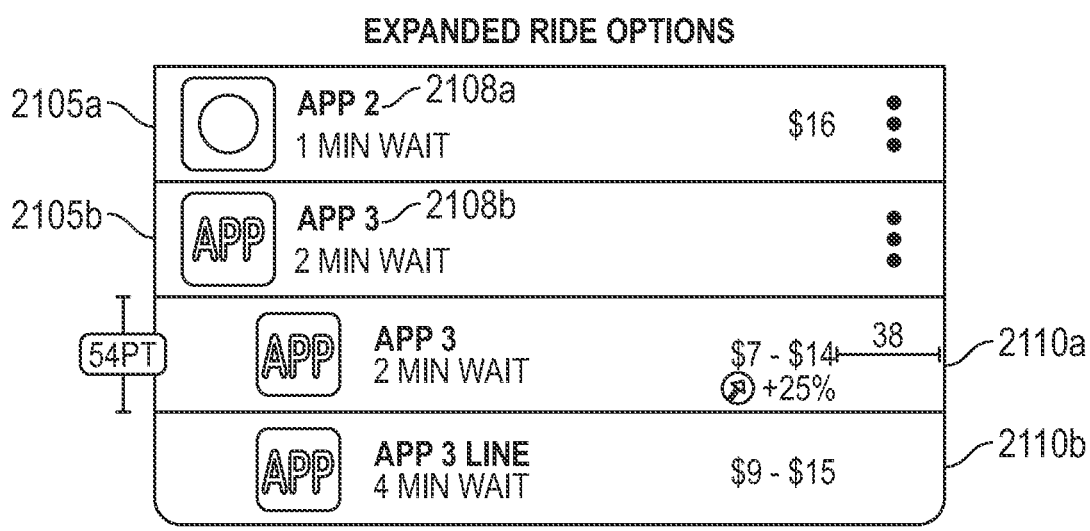
FIG. 21 is an exemplary ride sharing user interface.

FIG. 21 is an exemplary ride sharing user interface. The user interface 2100 includes two rows of applications or widgets 2105 containing applications or widgets 2108*a-b* respectively. The second application or widget 2108*a-b* also displays two additional detail windows 2110*a-b*.

Software Architecture

Figure 22:
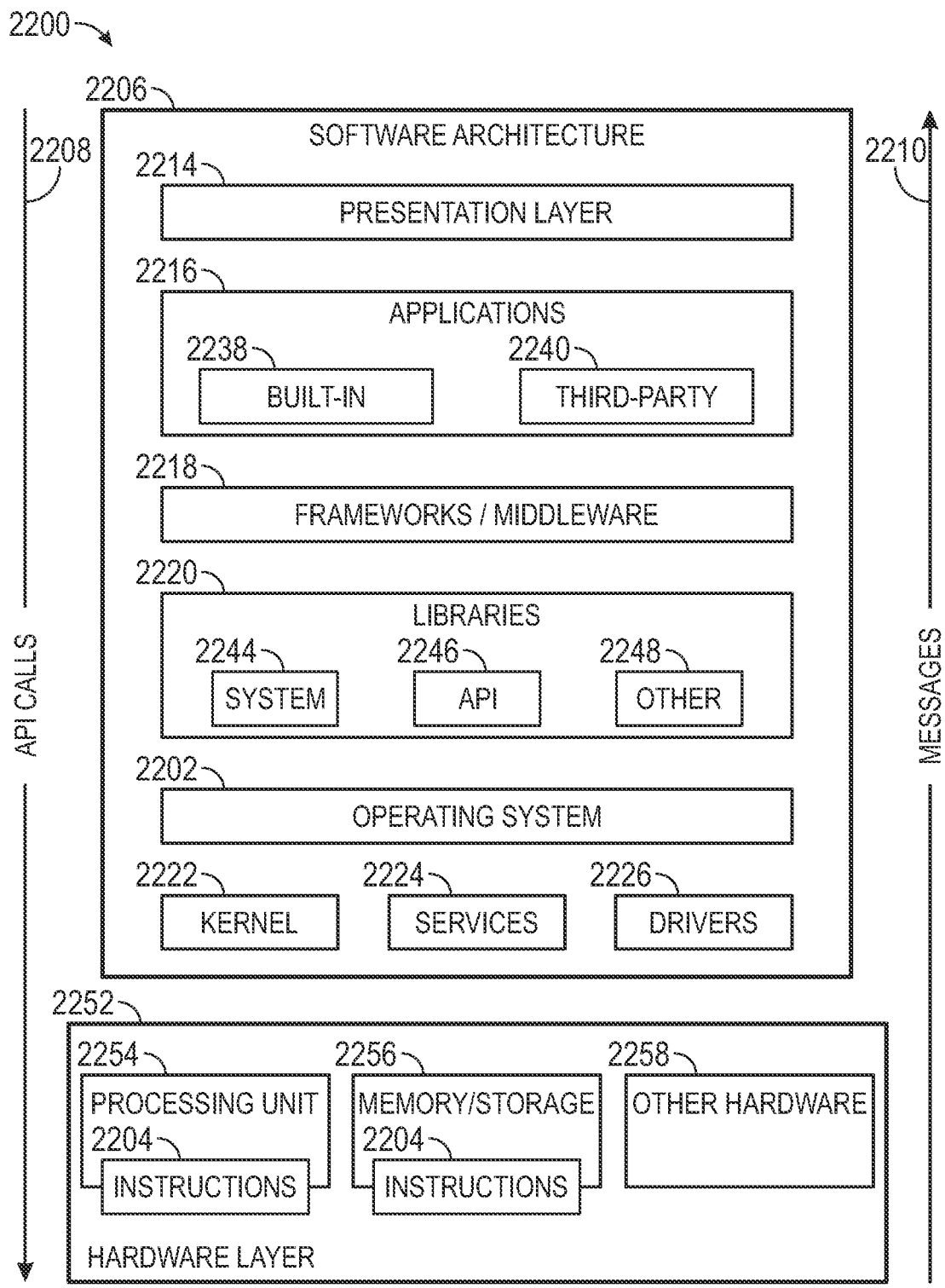
FIG. 22 is a block diagram illustrating an example software architecture

FIG. 22 is a block diagram illustrating an example software architecture 2206, which may be used in conjunction with various hardware architectures herein described. FIG. 22 is a non-limiting example of a software architecture and it will be appreciated that many other architectures may be implemented to facilitate the functionality described herein. The software architecture 2206 may execute on hardware such as a machine 2300 of FIG. 23 that includes, among other things, processors 2204, memory/storage 2206, and I/O components 2218. A representative hardware layer 2252 is illustrated and can represent, for example, the machine 2200 of FIG. 23. The representative hardware layer 2252 includes a processing unit 2254 having associated executable instructions 2204. The executable instructions 2204 represent the executable instructions of the software architecture 2206, including implementation of the methods, components, and so forth described herein. The hardware layer 2252 also includes memory and/or storage 2256, which also have the executable instructions 2204. The hardware layer 2252 may also comprise other hardware 2258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or widget or application or widget portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 22, the software architecture 2206 may be conceptualized as a stack of layers where each layer provides particular functionality. For example, the software architecture 2206 may include layers such as an operating system 2202, libraries 2220, frameworks/middleware 2218, applications 2216, and a presentation layer 2214. Operationally, the applications 2216 and/or other components within the layers may invoke API calls 2208 through the software stack and receive a response as messages 2210. The layers illustrated are representative in nature and not all software architectures have all layers. For example, some mobile or special-purpose operating systems may not provide a frameworks/middleware 2218 layer, while others may provide such a layer. Other software architectures may include additional or different layers.

The operating system 2202 may manage hardware resources and provide common services. The operating system 2202 may include, for example, a kernel 2222, services 2224, and drivers 2226. The kernel 2222 may act as an abstraction layer between the hardware and the other software layers. For example, the kernel 2222 may be responsible for memory management, processor management (e.g., scheduling), component management, networking, security settings, and so on. The services 2224 may provide other common services for the other software layers. The drivers 2226 are responsible for controlling or interfacing with the underlying hardware. For instance, the drivers 2226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2220 provide a common infrastructure that is used by the applications 2216 and/or other components and/or layers. The libraries 2220 provide functionality that allows other software components to perform tasks in an easier fashion than by interfacing directly with the underlying operating system 2202 functionality (e.g., kernel 2222, services 2224, and/or drivers 2226). The libraries 2220 may include system libraries 2244 (e.g., C standard library) that may provide functions such as memory allocation functions, string manipulation functions, mathematical functions, and the like. In addition, the libraries 2220 may include API libraries 2246 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2220 may also include a wide variety of other libraries 2248 to provide many other APIs to the applications 2216 and other software components/modules.

The frameworks/middleware 2218 provide a higher-level common infrastructure that may be used by the applications 2216 and/or other software components/modules. For example, the frameworks/middleware 2218 may provide various graphic user interface (GUI) functions, high-level resource management, high-level location services, and so forth. The frameworks/middleware 2218 may provide a broad spectrum of other APIs that may be utilized by the applications 2216 and/or other software components/modules, some of which may be specific to a particular operating system 2202 or platform.

The applications 2216 include built-in applications 2238 and/or third-party applications 2240. Examples of representative built-in applications 2238 may include, but are not limited to, a contacts application, a browser application, a book reader application, a location application, a media application, a messaging application, and/or a game application. The third-party applications 2240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2240 may invoke the API calls 2208 provided by the mobile operating system (such as the operating system 2202) to facilitate functionality described herein.

The applications 2216 may use built-in operating system functions (e.g., kernel 2222, services 2224, and/or drivers 2226), libraries 2220, and frameworks/middleware 2218 to create user interfaces to interact with users of the system. Alternatively, or additionally, in some systems interactions with a user may occur through a presentation layer, such as the presentation layer 2214. In these systems, the application/component "logic" can be separated from the aspects of the application/component that interact with a user.

Exemplary Machine

Figure 23:
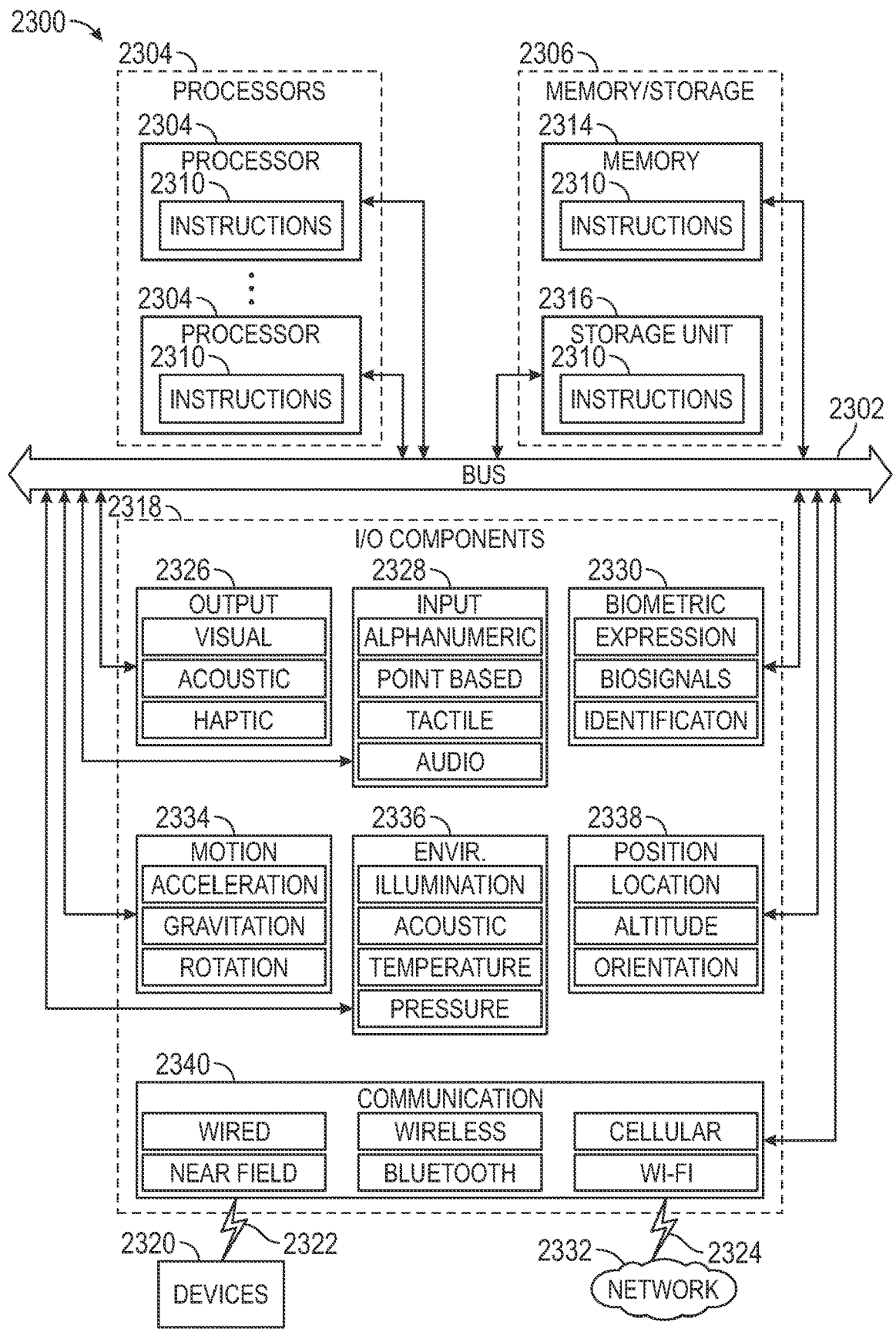
FIG. 23 is a block diagram illustrating exemplary components (also referred to herein as "modules") of a machine.

FIG. 23 is a block diagram illustrating exemplary components (also referred to herein as "modules") of a machine 2300. In some aspects, the machine is configured to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2310 (e.g., software, a program, an application, an applet, an app, or other executable code) for causing the machine 2300 to perform any one or more of the methodologies discussed herein may be executed. As such, the instructions 2310 may be used to implement modules or components described herein. The instructions 2310 transform the general, non-programmed machine 2300 into a particular machine 2300 programmed to carry out the described and illustrated functions in the manner described. In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2310, sequentially or otherwise, that specify actions to be taken by machine 2300. Further, while only a single machine 2300 is illustrated, the term "machine" shall also be taken to include a collection of machines that individually or jointly execute the instructions 2310 to perform any one or more of the methodologies discussed herein.

The machine 2300 may include processors 2304, memory/storage 2306, and I/O components 2318, which may be configured to communicate with each other such as via a bus 2302. The memory/storage 2306 may include a memory 2314, such as a main memory, or other memory storage, and a storage unit 2316, both accessible to the processors 2304 such as via the bus 2302. The storage unit 2316 and memory 2314 store the instructions 2310 embodying any one or more of the methodologies or functions described herein. The instructions 2310 may also reside, completely or partially, within the memory 2314, within the storage unit 2316, within at least one of the processors 2304 (e.g., within the processor's cache memory), or any suitable combination thereof, during execution thereof by the machine 2300. Accordingly, the memory 2314, the storage unit 2316, and the memory of the processors 2304 are examples of machine-readable media. In some aspect, the processors 410 and processors 2304 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 2318 may include a wide variety of components to provide a user interface for receiving input, providing output, producing output, transmitting information, exchanging information, capturing measurements, and so on. The specific I/O components 2318 that are included in the user interface of a particular machine 2300 will depend on the type of machine. For example, portable machines such as mobile phones will likely include a touch input device or other such input mechanisms, while a headless server machine will likely not include such a touch input device. It will be appreciated that the I/O components 2318 may include many other components that are not shown in FIG. 23. The I/O components 2318 are grouped according to functionality merely for simplifying the following discussion and the grouping is in no way limiting. In various exemplary embodiments, the I/O components 2318 may include output components 2326 and input components 2328. The output components 2326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 2328 may also include one or more image-capturing devices, such as a digital camera for generating digital images and/or video.

In further exemplary embodiments, the I/O components 2318 may include biometric components 2330, motion components 2334, environment components 2336, or position components 2338, as well as a wide array of other components. For example, the biometric components 2330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2334 may include acceleration sensor components (e.g., accelerometer), gravitation sensor components, rotation sensor components (e.g., gyroscope), and so forth. The environment components 2336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2318 may include communication components 2340 operable to couple the machine 2300 to a network 2332 or devices 2320 via a coupling 2324 and a coupling 2322 respectively. For example, the communication components 2340 may include a network interface component or other suitable device to interface with the network 2332. In further examples, the communication components 2340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2320 may be another machine or any of a wide variety of peripheral devices (e.g., a peripheral device coupled via a USB).

Moreover, the communication components 2340 may detect identifiers or include components operable to detect identifiers. For example, the communication components 2340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 2340, such as location via Internet Protocol (IP) geo-location, location via Wi-Fi® signal triangulation, location via detecting an NFC beacon signal that may indicate a particular location, and so forth.

Figure 24:
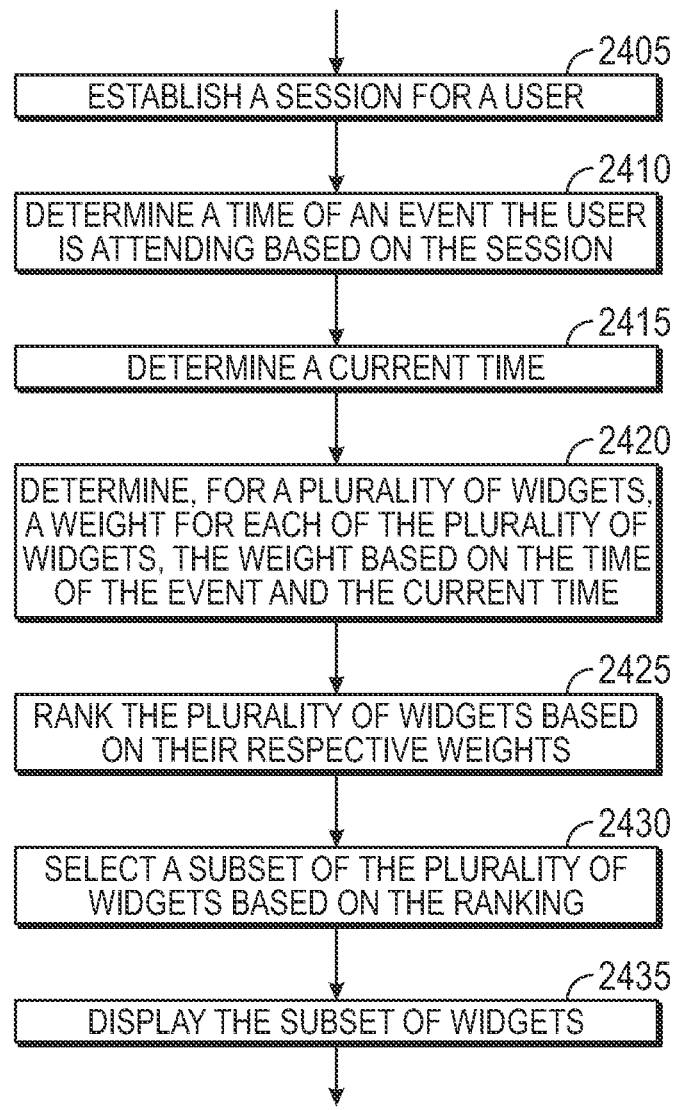
FIG. 24 is a flowchart of a method of displaying widgets in a user interface.

FIG. 24 is a flowchart of a method of executing one or more applications. The executed applications may display information, such as content, in a user interface. In some aspects, one or more of the functions discussed below with respect to FIG. 24 may be performed by one or more hardware processors, such as the processor 410, discussed above with respect to FIG. 4. For example, in some aspects, instructions stored in an electronic memory (e.g. instructions 2204 and/or 2310 discussed above) may configure the one or more hardware processors (e.g. one or more processors 2304 and/or processing unit 2254, discussed above) to perform one or more of the functions discussed below with respect to FIG. 24.

In block 2405, a session is established for a user. In some aspects, the session may be established with a social networking system, such as the social network system 116 and/or the messaging server application 114. The session may make available data specific to the user, such as identification of the user's friends, events the user may be scheduled to attend, has attended, or is currently attending, and other characteristics of the user. In some aspects, the session may be established based on authentication credentials specific to the user, such as a user name and/or password of the user.

In block 2410, a time of an event is determined. The event may be an event the user is scheduled to attend, is currently attending, or previously attended. In some aspects, the time may be a future time, a present or current time, or a past time. In some aspects, the time of the event may be determined based on data structures available via the user's session. For example, as discussed above with respect to FIG. 25, the table 2540 may indicate which users are attending which events. Details of each event may be obtained by cross referencing the event id 2542 in table 2540 with the event id 2532 in table 2530.

In block 2415, a current time is obtained. In some aspects, the current time may be determined by invoking an operating system API, such as gettime( ) or similar.

In block 2420, a weight is determined for a plurality of applications. At least one of the weights is based on the time of the event and the current time. For example, in some aspects, block 2420 may determine whether the current time is within a first time range, defined as before a start time of the event, a second time range after an end time of the event, or a third time range in between the start and end time. In some aspects, the weight may be based on whether the current time falls within the first, second or third time range.

As discussed above with respect to FIGS. 9-11, in some aspects, the weights may be determined based on a dynamic weight determination process. For example, one or more conditions may be identified with respect to each of the plurality of applications. The conditions may be evaluated. If evaluation of the condition meets a criterion, a weight associated with the condition may be added to a weight of the application. Thus, weights associated with the evaluated conditions meeting the criteria may be aggregated to determine a total weight for the application.

In some aspects, conditions associated with one or more applications may evaluate the current time relative to the three time ranges (or other time range) discussed above, and determine a weight for an application associated with the conditions. Conditions associated with some other applications may not consider the time ranges when determining their weight. Instead, these applications may determine their respective weights based on other factors.

In some aspects of block 2420, a geographic location of the user may be determined, and the weight of one or more of the plurality of applications is further based on the geographic location of the user. In some aspects of block 2420, the weight for at least one of the plurality of applications is determined based on a relationship between the time of the event and the current time. For example, as discussed above with respect to FIG. 5, a current time may be evaluated against an event time, such as event 502, and a determination made as to whether the current time is in a time period preceding the event (e.g. any of 504*a-b*), a time period of the event, (e.g. between 506*b* and 506*c*), or a time period after the event (e.g. any of 504*c-d*).

In some aspects, the weight of one or more of the plurality of applications may be based on a type of the respective application. For example, as discussed above, applications may be categorized into a plurality of types. Zero or more applications may be assigned to a set of types. The assignment may be stored in the type field 805 of the application database 800 in some aspects. In some aspects, particular input to an application of a particular type may cause weights of other applications of the same type to increase. For example, input to a ride sharing application may serve as a signal that a user is interested in ride sharing applications, and therefore the weight of other ride sharing applications may be increased. In some aspects, this increased weight may result in additional ride sharing applications being invoked and displayed in some aspects.

In block 2425, the plurality of applications are ranked based on their respective weights. In some aspects, higher weights are ranked more highly than lower weights. In other aspects, lower weights may be ranked more highly than higher weights. In some aspects, the ranking may determine only which "n" applications have the best or highest weights. N may vary by implementation, but may be two (2), three (3), four (4), five (5), or six (6) applications in various embodiments. Other embodiments may consider more than six (6) applications in the ranking. In some aspects, the applications are ranked based on the total weight column 828 of an application database.

In block 2430, a subset of the plurality of applications are selected based on the ranking. For example, in some aspects, one or more applications having the highest or in other embodiments, lowest ranking may be selected in block 2430.

In block 2435, the subset of selected applications are invoked or executed. Invoking the selected applications may cause the applications to display information on an electronic display of a device. For example, as discussed above with respect to any of FIGS. 13-21, selected applications may display information to a user based on the context of the user.

As discussed above with respect to FIG. 10, in some aspects, process 2400 may also include identifying, for one or more applications in the subset of applications, one or more parameter values. For each of the one or more parameter values, one or more parameter conditions associated with the respective parameter value may be identified. The identified parameter conditions may be evaluated, and a weight for each of the parameter values may be determined based on the evaluation. For example, if an evaluated condition meets a criterion (i.e. the condition evaluates to a true or false value), then a weight associated with the condition (e.g. via the parameter condition relational database 840) may be added or aggregated to a total weight for the parameter value (e.g. 828).

The total weights for each of the parameter values may then be ranked, and a parameter value having the best or highest ranking may be passed to the application when it is invoked. Parameter values for one or more applications invoked by process 2400 may be ranked in a similar manner.

In some aspects, one or more conditions associated with a parameter value for an application may consider one or more locations of friends of the user. For example, evaluation of a condition associated with a parameter value may include determining one or more friends of the user based on the session, and determining one or more geographic locations of the friends of the user. The result of the evaluation of the condition may depend on the location of the friends relative to the location of the user. As one example, if a threshold number of friends of the user are clustered together in one general geographic location (i.e. within a threshold radius of each other), then a ride sharing or other transport application may be provided with a default location of the cluster of friends when invoked. The user may have a desire to travel to a location of this cluster of friends in some aspects.

Figure 25:
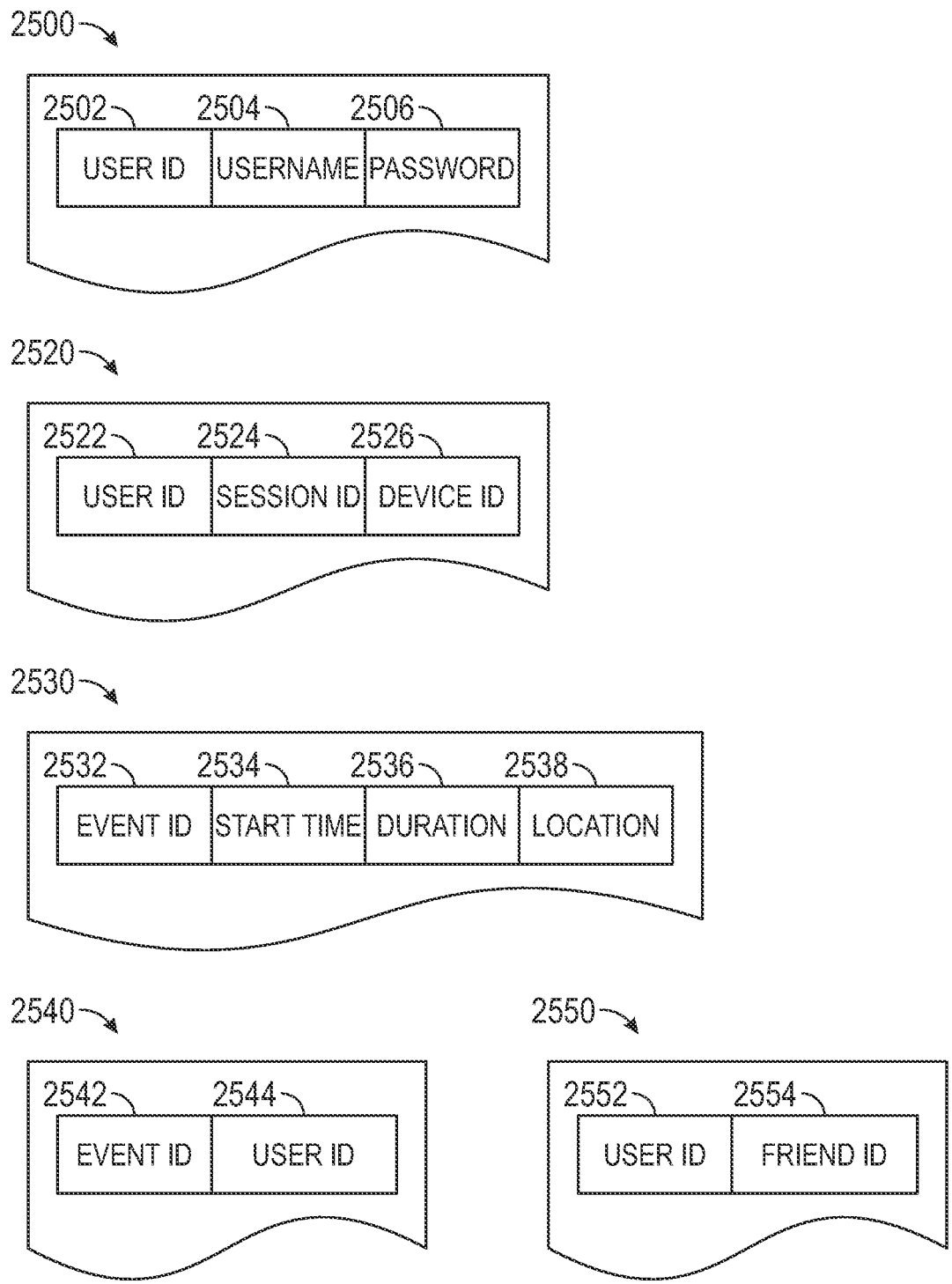
FIG. 25 shows example formats for databases that may be utilized in some aspects of the disclosed embodiments.

FIG. 25 shows several relational databases, one or more of which that may be utilized in at least some of the disclosed embodiments. FIG. 25 shows a user account database 2500, a session database 2520, an event database 2530, an event attendance database 2540, and a friend relationships database 2550. The user account database 2500 includes a user id column 2502, username column 2504, and a password column 2506. The user id column 2502 may store a unique identifier for a user. The username column 2504 may store a user name for the user, and the password column 2506 stores a password, which may be encrypted.

The session database may store a user id 2522, a session identifier 2525, and a device identifier 2526. The user id column 2522 may store a value that is also stored in the user id column 2502. The session database may track active sessions of a social network. The session id column 2524 may provide a unique identifier for an active session with the user matching the user id 2522. The device id 2526 may provide an identification of a device with which the session 2524 is established. For example, the device id 2526 may store a station address or other unique identifier of a device.

The event database 2530 may store information regarding events managed by a social network. The event database 2530 may store an event identifier 2532, which uniquely identifies a particular event, a start time 2534 of the event, a duration of the event 2536, and a location 2538 of the event. An end time of the event may be determined in some aspects by adding the duration 2536 to the start time 2534.

The event attendance database 2540s may store an event id 2542 and a user id 2544. If an entry exists in the event attendance database 2540 for a particular event id 2542 and a particular user id 2544, this indicates, in some aspects, that the user identified by the user id 2544 is attending or scheduled to attend the event identified by the event id 2542. Details of the event identified by the event id 2542 may be obtained from the event database 2530 by cross-referencing the event id columns 2542 and 2532.

The friend relationships database 2550 may store a user id 2552 and a friend id 2554. If a particular user is identified by the friend id 2554, this indicates the particular user is a friend of the user identified by the user id 2552. The friend relationships database 2550 may be utilized in various aspects to find friends of a particular user. For example, as discussed above, in some aspects the friends database may be utilized to identify clusters of friends of a user in a particular location in some aspects. For example, locations of users/friends may be determined in some aspects by requesting location information from user devices, as stored in the session database 2520.

Figure 26:
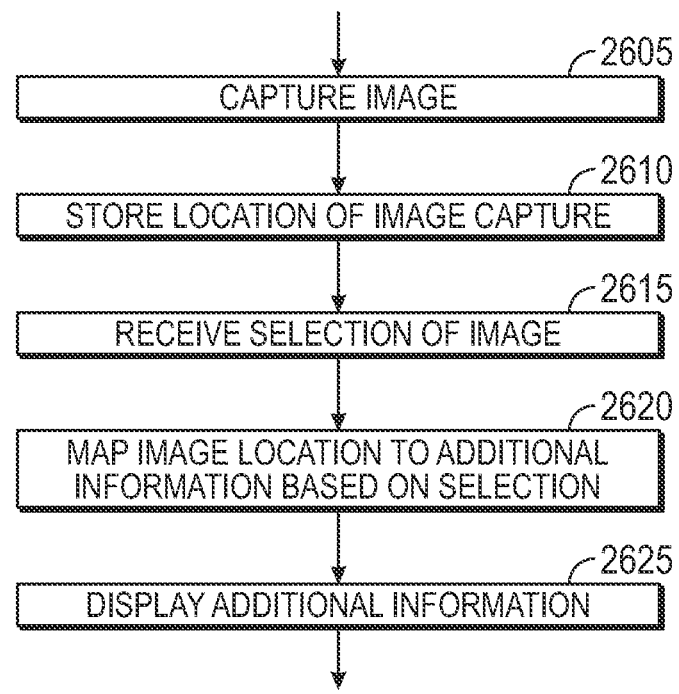
FIG. 26 is a flowchart of an example method of displaying information.

FIG. 26 is a flowchart of an example method of displaying information. In some aspects, one or more of the functions discussed below with respect to FIG. 26 may be performed by one or more hardware processors, such as the processor 410, discussed above with respect to FIG. 4. For example, in some aspects, instructions stored in an electronic memory (e.g. instructions 2204 and/or 2310 discussed above) may configure the one or more hardware processors (e.g. one or more processors 2304 and/or processing unit 2254, discussed above) to perform one or more of the functions discussed below with respect to FIG. 26.

In block 2605, an image is captured. For example, the image may be captured by an imaging sensor, such as an image sensor included in a client device 102. In block 2610, a location, for example, of the client device is obtained and stored. The location may be obtained, in some aspects, from a GPS sensor included on the client device 102. The location may be captured within a predetermined time period of the image capture of block 2605, such that the location accurately reflects a location of the image capture. Fore example, the predetermined time period may be two minutes or less.

In block 2615, a selection of the image is received. In some aspects, after the image is captured, a user may share the image with other users of the social network. For example, in some aspects, the user may include the image as part of their "story" as discussed above. This may provide an opportunity for other users to select and view the image.

In block 2620, the image location is mapped to additional information. For example, some embodiments may maintain a database that maps locations to information about what exists at the location. For example a database of points of interest may include not only locations of the points of interest, but also details about the points of interest. Thus, if an image is captured at a restaurant for example, block 2620 may determine that the image is captured at the restaurant, based on the location information and the points of interest database. This additional information may include items such as address, phone number, name, hours of operation, other images associated with the location, etc. In some aspects, the location information may be considered along with current time information. For example, concert venues may operate from a single location but host multiple acts at different times and/or dates. Some embodiments may maintain or have access to databases that map venue information and time information to particular events. For example, perhaps Band X is playing at 8 PM at venue A, and Band Y starts playing at 10 PM at venue A. Based on the databases that provide this information, the disclosed embodiments may be able to determine a specific artist or event that is occurring when the image is taken. Thus, block 2620 may then retrieve information that is not only specific to the venue at the location, but also specific to a particular event occurring at the venue at a particular time. Thus, the additional information In some aspects, the location may be mapped to additional information based on other factors. For example, some embodiments may maintain a database of celestial events, such as comets, eclipses, meteor showers, planets above the horizon, or other celestial events. Based on the location at which the image is taken, the disclosed embodiments may determine the use is capturing images of a celestial event that is occurring at the location. Thus, in these aspects, the additional information retrieved based on the location may reference the current celestial event occurring at that location. In some aspects, a bearing or direction in which an image capture device (such as the client device 102) is facing when the image is captured may be considered by block 2620.

In block 2625, upon selection of the image, this additional information may be displayed. For example, in some aspects, a "swipe up" action on the image may cause display of at least some of the additional information. In some aspects, the display may be conditioned based on a bearing or direction the display device is facing when the additional information is displayed. For example, in some aspects, the image device capturing the image in block 2605 may be facing a first direction when capturing the image. When the image is displayed in block 2625, the display of the image may be shifted as necessary to align the image content with the direction of the display device. For example, if the image was captured by a device facing south, the image may not be displayed in block 2625 until the display device is also bearing south, or at least at a bearing that overlaps a field of view of the client device 102 when the image was captured.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document.

We claim:

1. A method comprising:
   identifying, via one or more hardware processors, a plurality of widgets;
   determining a weight for each of the plurality of widgets;
   detecting that a user device has transgressed a given velocity;
   in response to detecting that the user device has transgressed the given velocity, modifying the determined weight for each of the plurality of widgets, the determined weight being modified by:
   determining a geographic location of the user corresponds to a location of a venue;
   determining that a first widget of the plurality of widgets is venue oriented; and
   assigning a first rank to the first widget that is greater than a second rank assigned to a second widget in response to determining that the first widget is venue oriented; and
   causing display of at least some of the identified plurality of widgets based on the modified weight of each of the plurality of widgets.

2. The method of claim 1, wherein the given velocity represents vehicle motion.

3. The method of claim 1, further comprising:
   displaying the plurality of widgets;
   identifying, for each of the plurality of widgets, one or more conditions associated with a respective widget; and
   determining the weight for each of the plurality of widgets by aggregating the weights associated with a subset of the one or more conditions associated with the respective widget which are determined to have been satisfied.

4. The method of claim 1, further comprising:
   detecting input that expands a given widget of the plurality of widgets;
   determining a type of the given widget in response to detecting the input that expands the given widget; and displaying one or more additional widgets that correspond to the determined type of the given widget in response to detecting the input that expands the given widget.

5. The method of claim 1, further comprising:
determining that a user is scheduled to attend an event;
determining that a first widget of the plurality of widgets is configured to assist the user to travel to the event; and
assigning the first rank to the first widget that is greater than the second rank in response to determining that the first widget is configured to assist the user to travel to the event.

6. The method of claim 1, further comprising:
determining a start time and an end time for an event;
assigning a weight for at least one of the plurality of widgets based on whether a current time is before the start time, between the start time and the end time, or after the end time;
increasing a weight for the first widget of the plurality of widgets in response to determining that a current time is past the end time by a first threshold amount of time; and
causing the second widget of the plurality of widgets to play music related to the event in response to determining that the current time is prior to the start time of the event by a second threshold amount of time.

7. The method of claim 1, wherein the first widget of the plurality of widgets has a first functionality, and a first condition associated with the first widget returns a true value if a current time is within a threshold time period before an event, and a first weight is associated with the first condition, and a second condition associated with the first widget returns a true value if the current time is not within a threshold time period before the time period, and a second weight is associated with the second condition, wherein the second weight is lower than the first weight.

8. The method of claim 7, wherein the first functionality includes ridesharing functionality, the first widget being a first ridesharing widget, and the method further comprises displaying a user interface element for the first ridesharing widget on an electronic display, and wherein selection of the user interface element for the first ridesharing widget increases a weight of a second ride sharing widget.

9. The method of claim 1, further comprising:
determining one or more friends of the user;
determining one or more geographic locations of the friends of the user; and
determining weights for the plurality of widgets based on the determined one or more geographic locations of the friends of the user.

10. An apparatus, comprising:
hardware processing circuitry;
a hardware memory storing instructions that when executed configure the hardware processing circuitry to perform operations comprising:
identifying a plurality of widgets;
determining a weight for each of the plurality of widgets;
detecting that a user device has transgressed a given velocity;
in response to detecting that the user device has transgressed the given velocity, modifying the determined weight for each of the plurality of widgets, the determined weight being modified by:
determining a geographic location of the user corresponds to a location of a venue;
determining that a first widget of the plurality of widgets is venue oriented; and
assigning a first rank to the first widget that is greater than a second rank assigned to a second widget in response to determining that the first widget is venue oriented; and
causing display of at least some of the identified plurality of widgets based on the modified weight of each of the plurality of widgets.

11. The apparatus of claim 10, wherein the given velocity represents vehicle motion.

12. The apparatus of claim 10, further comprising operations for:
displaying the plurality of widgets;
identifying, for each of the plurality of widgets, one or more conditions associated with the respective widget; and
determining the weight for each of the plurality of widgets by aggregating the weights associated with a subset of the one or more conditions associated with the respective widget which are determined to have been satisfied.

13. The apparatus of claim 10, further comprising operations for:
detecting input that expands a given widget of the plurality of widgets;
determining a type of the given widget in response to detecting the input that expands the given widget; and
displaying one or more additional widgets that correspond to the determined type of the given widget in response to detecting the input that expands the given widget.

14. The apparatus of claim 10, further comprising operations for:
determining that a user is scheduled to attend an event;
determining that a first widget of the plurality of widgets is configured to assist the user to travel to the event; and
assigning a first rank to the first widget that is greater than a second rank assigned to a second widget of the plurality of widgets in response to determining that the first widget is configured to assist the user to travel to the event.

15. The apparatus of claim 10, wherein h first of the plurality of widgets has a first functionality, and a first condition associated with the first widget returns a true value if a current time is within a threshold time period before an event, and a first weight is associated with the first condition, and a second condition associated with the first widget returns a true value if the current time is not within a threshold time period before the time period, and a second weight is associated with the second condition, wherein the second weight is lower than the first weight.

16. The apparatus of claim 15, wherein the first functionality includes ridesharing functionality, wherein the first widget is a first ridesharing widget, and wherein the operations further comprise displaying a first ridesharing widget user interface element on an electronic display, and wherein selection of the first ridesharing user interface element increases a weight of a second ride sharing widget.

17. A non-transitory machine-readable storage medium including instructions that, when executed by one or more processors of a machine, cause the machine to perform operations comprising:
identifying a plurality of widgets;
determining a weight for each of the plurality of widgets;
detecting that a user device has transgressed a given velocity;
in response to detecting that the user device has transgressed the given velocity, modifying the determined weight for each of the plurality of widgets, the determined weight being modified by:

determining a geographic location of the user corresponds to a location of a venue;

determining that a first widget of the plurality of widgets is venue oriented; and assigning a first rank to the first widget that is greater than a second rank assigned to a second widget in response to determining that the first widget is venue oriented; and causing display of at least some of the identified plurality of widgets based on the modified weight of each of the plurality of widgets.

18. The non-transitory machine-readable storage medium of claim 17, wherein the given velocity represents vehicle motion.

\* \* \* \* \*